(12) United States Patent
Clay et al.

(10) Patent No.: US 10,018,493 B2
(45) Date of Patent: Jul. 10, 2018

(54) FLOW SENSOR CIRCUIT FOR MONITORING A FLUID FLOWPATH

(71) Applicant: General Electric Company, Schenectady, NY (US)

(72) Inventors: Brian K. Clay, Erie, CO (US); Helen Prieto Martinez, Brighton, CO (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/775,433

(22) PCT Filed: Mar. 12, 2013

(86) PCT No.: PCT/US2013/030452
§ 371 (c)(1),
(2) Date: Sep. 11, 2015

(87) PCT Pub. No.: WO2014/142806
PCT Pub. Date: Sep. 18, 2014

(65) Prior Publication Data
US 2016/0025540 A1   Jan. 28, 2016

(51) Int. Cl.
*G01F 1/68* (2006.01)
*G01F 1/698* (2006.01)
(Continued)

(52) U.S. Cl.
CPC .............. *G01F 1/698* (2013.01); *G01F 1/69* (2013.01); *G01F 1/696* (2013.01)

(58) Field of Classification Search
CPC .......... G01F 1/698; G01F 1/69; G01F 1/6986; G01F 1/696; G01F 1/007; G01F 15/00;
(Continued)

(56) References Cited

U.S. PATENT DOCUMENTS 3,803,913 A * 4/1974 Tracer ....................... G01F 1/68
73/204.14
4,685,331 A * 8/1987 Renken ................. G01F 1/6842
137/486
(Continued)

FOREIGN PATENT DOCUMENTS

GB        2337818 A   12/1999
JP       62231174 A   10/1987
(Continued)

OTHER PUBLICATIONS

Lancer, A method and apparatus for determing flow rate of a fluid, Feb. 5, 2004, WO 2004/011886.*
(Continued)

*Primary Examiner* — Manish S Shah
*Assistant Examiner* — Nigel Plumb
(74) *Attorney, Agent, or Firm* — Wegman, Hessler & Vanderburg

(57) ABSTRACT

A flow sensor circuit for a fluid flowpath having a self-heated thermistor situated in a fluid flowpath. The flow sensor circuit is configured to energize the thermistor sufficiently to heat the thermistor, calculate the slope of the leading edge of the rise in temperature of the thermistor when the thermistor is energized, and equate the slope to the state of the fluid flowing through the fluid flowpath. In another embodiment, the flow sensor circuit is configured to energize the thermistor, measure and calculate the average and standard deviation of the thermistor temperature, and determine the state of the flowpath using the thermistor temperature average and standard deviation.

23 Claims, 15 Drawing Sheets

(51) Int. Cl.
*G01F 1/696* (2006.01)
*G01F 1/69* (2006.01)

(58) Field of Classification Search
CPC ... G01F 1/6842; G01F 1/7084; E02D 41/187; E21B 48/1005; G01N 11/12
USPC ...... 73/204.14, 204.11, 861, 114.34, 152.33, 73/198, 202.5, 861.95, 54.16
See application file for complete search history.

(56) References Cited

U.S. PATENT DOCUMENTS

| | | | | |
|---|---|---|---|---|
| 5,243,858 | A * | 9/1993 | Erskine | G01F 1/7084 73/204.26 |
| 5,869,758 | A * | 2/1999 | Huiberts | G01F 1/6842 73/197 |
| 6,085,588 | A * | 7/2000 | Khadkikar | G01F 1/684 73/204.23 |
| 6,524,447 | B1 * | 2/2003 | Carmignani | A61L 2/088 204/157.15 |
| 6,644,103 | B1 * | 11/2003 | Hall | G01F 23/246 324/664 |
| 7,607,823 | B2 * | 10/2009 | Kent | G01M 3/002 374/147 |
| 2004/0002822 | A1 * | 1/2004 | Keck | G01F 23/00 702/55 |
| 2005/0189343 | A1 * | 9/2005 | Griffin | F02D 41/187 219/494 |
| 2009/0308752 | A1 * | 12/2009 | Evans | A61M 5/145 204/630 |

FOREIGN PATENT DOCUMENTS

| | | |
|---|---|---|
| JP | 63234113 A | 9/1988 |
| JP | 6446747 U | 3/1989 |
| JP | 02196949 A | 8/1990 |
| JP | 02213767 A | 8/1990 |
| JP | 05164586 A | 6/1993 |
| JP | 1164063 A | 3/1999 |
| JP | 11064063 A | 3/1999 |
| JP | H1164063 A | 3/1999 |
| JP | 2009156653 A | 7/2009 |
| JP | 2010107243 A | 5/2010 |
| WO | 2004011886 A2 | 2/2004 |

OTHER PUBLICATIONS

Fujita et al., "A Thermistor Anemometer for Low Flow Rate Measurements", IEEE Transaction on Instrumentation and Measurement, vol. No. 44, Issue No. 3, pp. 779-782, Jun. 1995.

PCT Search Report and Written Opinion issued in connection with corresponding Application No. PCT/US2013/030452 dated Dec. 6, 2013.

Unofficial English translation of Office Action issued in connection with corresponding JP Application No. 2016-500028 dated Jan. 10, 2017.

* cited by examiner

FLOW SENSOR CIRCUIT FOR MONITORING A FLUID FLOWPATH

FIELD OF THE INVENTION

This present invention is directed to electronic circuits and a method of using said circuits for monitoring the state of a fluid flowpath.

BACKGROUND OF THE INVENTION

The fluid flowpath of water analyzers, such as the Sievers 900 Laboratory Total Organic Carbon (TOC) Analyzer or CheckPoint Portable/On-Line TOC Sensor from GE Analytical Instruments of Boulder, Colo., have small passages that can become clogged. Accordingly, a need exists for reporting the status of the flowpath of a water analyzer. The present invention addresses this need.

BRIEF SUMMARY OF THE INVENTION

In one aspect of the invention, a flow sensor circuit for a fluid flowpath comprises: a thermistor circuit having a self-heated thermistor situated in a fluid flowpath, a processing unit, and a constant voltage or constant current source; wherein the flow sensor circuit is configured to: energize the thermistor sufficiently with the constant voltage or constant current source to effect a rise in temperature of the thermistor, wherein the rise of temperature of the thermistor has a leading edge with a slope; and calculate the slope of the leading edge with the processing unit.

In another aspect of the invention, the processing unit is configured to examine the calculated slope of the leading edge of the rise in temperature of the energized thermistor to determine whether the fluid in the fluid flowpath is flowing normally, stagnant, or contains air bubbles by comparing the calculated slope with predetermined slope values indicating normal fluid flow, stagnant fluid, and the presence of intermittent air bubbles in the fluid flowpath.

In a further aspect of the invention, the fluid flowpath is comprised of a pump adjacent to the thermistor.

In a further aspect of the invention, the fluid in the flowpath is flowing normally when the slope of the leading edge of the rise in temperature of the energized thermistor is between about $1.63+0.35-0.39°$ C./second; wherein the fluid is stagnant in the flowpath when the slope of the leading edge of the rise in temperature of the energized thermistor is between about $1.05+0.08,-0.11°$ C./second; and wherein intermittent air bubbles are present in the fluid when the slope of the leading edge of the rise in temperature of the energized thermistor is between about $2.93+1.02,-0.057°$ C./second.

In yet another aspect of the invention, flow sensor circuit for a fluid flowpath in a water analyzer comprises: a processing unit and a single self-heated thermistor; the thermistor is situated in a fluid flowpath of a water analyzer, wherein the fluid flowpath comprises a pump arranged adjacent to the thermistor; the thermistor circuit configured to periodically: energize the thermistor sufficiently to effect a rise in temperature of the thermistor, wherein the rise of temperature of the thermistor has a leading edge; and calculate the slope of the leading edge; wherein the thermistor is energized with a constant voltage or constant current source; wherein the slope of the leading edge of the rise in temperature of the energized thermistor is calculated by the processing unit.

In a further aspect of the invention, the processing unit is configured to examine the slope of the leading edge of the rise in temperature of the energized thermistor to determine whether the fluid in the fluid flowpath is flowing normally, stagnant, or contains air bubbles; wherein the flow sensor circuit is further comprised of a display configured to inform the user as to whether the fluid in the fluid flowpath is flowing normally, stagnant, or contains air bubbles.

In a further aspect of the invention, the energized thermistor has an applied voltage, a resistance, a temperature, and a temperature-resistance curve; wherein the flow sensor circuit is configured to provide the processing unit with a representation of the amount of current flowing through the thermistor; wherein the processing unit calculates the temperature of the thermistor using the resistance value of the thermistor and the temperature-resistance curve of the thermistor; wherein the processing unit calculates the resistance of the thermistor using Ohm's law, the amount of current flowing through the thermistor, and the voltage applied to the thermistor; wherein the thermistor circuit is further comprised of a thermistor switch, voltage regulator, and thermistor drive.

In a further aspect of the invention, the energized thermistor has a voltage drop, a resistance, a temperature, and a temperature-resistance curve; wherein the flow sensor circuit is configured to provide the processing unit with the value of the voltage drop across the thermistor; wherein the processing unit calculates the temperature of the thermistor using the resistance value of the thermistor and temperature-resistance curve of the thermistor; wherein the processing unit calculates the resistance of the thermistor using Ohm's law, the amount of current flowing through the thermistor, and the voltage drop across the thermistor; wherein the thermistor circuit is further comprised of a current source, thermistor switch, and digital-to-analog converter.

In yet another aspect of the invention, a method of sensing the flow of fluid in a fluid flowpath, the method comprises: providing a flow sensor circuit having a self heated thermistor situated in a fluid flowpath and a constant voltage or constant current source; energizing the thermistor sufficiently to effect a rise in temperature of the thermistor, wherein the thermistor is energized with the constant voltage or constant current source; and calculating the slope of the leading edge for each rise in temperature of the energized thermistor and equating the slope of the leading edge for each rise in temperature of the thermistor with the state of the fluid flowing through the fluid flowpath.

In a further aspect of the invention, the energized thermistor has an applied voltage, a resistance, a temperature, and a temperature-resistance curve; wherein the temperature of the thermistor is calculated by providing a processing unit with a representation of the amount of current flowing through the thermistor; wherein the processing unit calculates the temperature of the thermistor using the resistance value of the thermistor and the temperature-resistance curve of the thermistor; wherein the processing unit calculates the resistance of the thermistor using Ohm's law, the amount of current flowing through the thermistor, and the voltage applied to the thermistor.

In a further aspect of the invention, the energized thermistor has a voltage drop, a resistance, a temperature, and a temperature-resistance curve; wherein the temperature of the thermistor is calculated by providing a processing unit with the voltage drop across the thermistor; wherein the processing unit calculates the temperature of the thermistor using the resistance value of the thermistor and temperature-resistance curve of the thermistor; wherein the processing unit calculates the resistance of the thermistor using Ohm's law, the amount of current flowing through the thermistor, and the voltage drop across the thermistor.

In a further aspect of the invention, the fluid flowpath is the fluid flowpath of a water analyzer; wherein the water analyzer is further comprised of a display indicating whether the fluid in the fluid flowpath is flowing normally, stagnant, or contains air bubbles.

In yet another aspect of the invention, a flow sensor circuit for a fluid flowpath comprises: a processing unit, a self-heated thermistor, and a constant voltage or constant current source; wherein the thermistor is situated in a fluid flowpath; the flow sensor circuit is configured to: apply a high current to the thermistor during a first time period (T1); obtain multiple measurements of the temperature of the thermistor with the processing unit while the high current is applied to the thermistor during a second time period (T2); calculate the average (T2av) and standard deviation (T2sd) of the measurements obtained during T2 using the processing unit; apply a low current to the thermistor during a third time period (T3); obtain multiple measurements of the temperature of the thermistor with the processing unit while the high current is applied to the thermistor during a fourth time period (T4); calculate the average (T4av) and standard deviation (T4sd) of the measurements obtained during T4 with the processing unit; and ascertain the state of the flowpath using the T2sd and the T4sd with the processing unit.

In a further aspect of the invention, the processing unit is configured to ascertain the state of the flowpath by comparing at least one of the T2sd, T4sd, T2av, and T4av to a bubble clog standard deviation threshold and an air stoppage standard deviation threshold to determine whether the flowpath is flowing normally, contains bubbles or is clogged, or contains air or is stopped.

In a further aspect of the invention, the processing unit is further configured to ascertain the state of the flowpath by comparing the difference between T2av and T4av to an air threshold and a stopped threshold to determine whether the flowpath is stopped or contains air.

In a further aspect of the invention, the processing unit is further configured to ascertain the state of the flow sensor circuit by comparing at least one of the T2sd, T4sd, T2av, and T4av to at least one of a calibration threshold, standard deviation low temperature fault threshold, and an average low temperature fault threshold to determine whether the thermistor is calibrated, whether the flow sensor circuit is open, whether the flow sensor circuit has a fault, or whether the flow sensor circuit is operating normally.

In a further aspect of the invention, the thermistor is an IC thermistor and the flow sensor circuit is further comprised of a TC thermistor; wherein the processing unit is further configured to ascertain the state of the flow sensor circuit by comparing a calibration threshold to the absolute value of the difference between T4av for the IC thermistor and T4av for the TC thermistor to determine if the IC thermistor and the TC thermistor are calibrated.

In a further aspect of the invention, the processing unit is further configured to ascertain the state of the flow sensor circuit by comparing T2sd to a standard deviation low temperature threshold to determine if the thermistor is reading the actual temperature, comparing the difference between T2av and T4av to an average low temperature threshold to determine if the thermistor is self-heating, comparing at least one of the T2av and T4av to at least one of a high temperature electronic fault threshold and a low temperature electronic fault threshold to determine if an electronic fault is present in the flow sensor circuit.

In yet another aspect of the invention, a method of ascertaining the state of a fluid flowpath, the method comprises: providing a flow sensor circuit having a processing unit and a self-heated thermistor; wherein the thermistor is situated in a fluid flowpath; energizing the thermistor with a high current during a first time period (T1); obtaining multiple measurements of the temperature of the thermistor using the processing unit while the high current is applied to the thermistor during a second time period (T2); calculating an average (T2av) and a standard deviation (T2sd) of the measurements obtained during T2 using the processing unit; energizing the thermistor with a low current during a third time period (T3); obtaining multiple measurements of the temperature of the thermistor using the processing unit while the low current is applied to the thermistor during a fourth time period (T4); calculating an average (T4av) and a standard deviation (T4sd) of the measurements obtained during T4 using the processing unit; and ascertaining the state of the flowpath using the T2sd and the T4sd using the processing unit.

In a further aspect of the invention, the energized thermistor has an applied voltage, a resistance, a temperature, and a temperature-resistance curve; wherein the temperature of the thermistor is measured by providing the processing unit with a representation of the amount of current flowing through the thermistor; wherein the processing unit calculates the temperature of the thermistor using the resistance value of the thermistor and the temperature-resistance curve of the thermistor; wherein the processing unit calculates the resistance of the thermistor using Ohm's law, the amount of current flowing through the thermistor, and the voltage applied to the thermistor.

In a further aspect of the invention, the energized thermistor has a voltage drop, a resistance, a temperature, and a temperature-resistance curve; wherein the temperature of the thermistor is measured by providing the processing unit with the voltage drop across the thermistor; wherein the processing unit calculates the temperature of the thermistor using the resistance value of the thermistor and temperature-resistance curve of the thermistor; wherein the processing unit calculates the resistance of the thermistor using Ohm's law, the amount of current flowing through the thermistor, and the voltage drop across the thermistor.

In a further aspect of the invention, the fluid flowpath is the fluid flowpath of a water analyzer; wherein the water analyzer is further comprised of a display indicating whether the fluid flowpath is flowing normally, contains bubbles or is clogged, or contains air or is stopped.

In a further aspect of the invention, the display further indicates whether the flow sensor circuit is open, the flow sensor circuit has a fault, or the flow sensor circuit is operating normally.

Advantages of the present invention will become more apparent to those skilled in the art from the following description of the embodiments of the invention which have been shown and described by way of illustration. As will be realized, the invention is capable of other and different embodiments, and its details are capable of modification in various respects.

BRIEF DESCRIPTION OF SEVERAL VIEWS OF THE DRAWINGS

These and other features of the present invention, and their advantages, are illustrated specifically in embodiments of the invention now to be described, by way of example, with reference to the accompanying diagrammatic drawings, in which.

Figure 1:
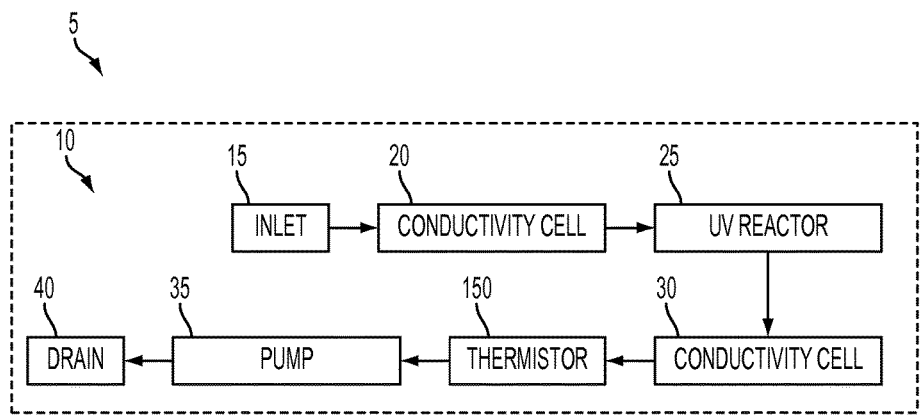
FIG. 1 illustrates the flowpath of a water analyzer employing a self-heated thermistor according to an embodiment of the present invention.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawings and description are to be regarded as illustrative in nature and not as restrictive.

DETAILED DESCRIPTION OF THE PREFERRED EMBODIMENT

Approximating language, as used herein throughout the specification and claims, may be applied to modify any quantitative representation that could permissibly vary without resulting in a change in the basic function to which it is related. Accordingly, a value modified by a term or terms, such as "about", is not limited to the precise value specified. In at least some instances, the approximating language may correspond to the precision of an instrument for measuring the value. Range limitations may be combined and/or interchanged, and such ranges are identified and include all the sub-ranges stated herein unless context or language indicates otherwise. Other than in the operating examples or where otherwise indicated, all numbers or expressions referring to quantities of ingredients, reaction conditions and the like, used in the specification and the claims, are to be understood as modified in all instances by the term "about".

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

As used herein, the terms "comprises", "comprising", "includes", "including", "has", "having", or any other variation thereof, are intended to cover a non-exclusive inclusion. For example, a process, method, article or apparatus that comprises a list of elements is not necessarily limited to only those elements, but may include other elements not expressly listed or inherent to such process, method, article, or apparatus.

The singular forms "a", "an", and "the" include plural referents unless the context clearly dictates otherwise.

Water analyzers 5, such as the one shown in FIG. 1, have a fluid flowpath 10. Some water analyzers use autosamplers to sample vials containing different waters for analysis. Sometimes a vial is mistakenly omitted from its sampling position in the autosampler, or the vial is left empty inadvertently, thereby allowing air to enter the fluid stream of the fluid path. Also, some water analyzers having an oxidizer use a routine that automatically adjusts the oxidizer flow rate to find the optimum for a particular water sample. When the oxidizer flow rate is too high, extra oxygen bubbles are generated that adversely affect the proper reporting of TOC. Accordingly, a need exists for detecting the presence of air in the flowpath of a water analyzer.

Additionally, water analyzers use pumps, which can stop pumping for various reasons. For example, in water analyzers that use a peristaltic pump, the stepper motor of the peristaltic pump can fail mechanically (e.g. worn bearings), electrically (e.g. corroded cable connection) or for other reasons (e.g. software bug). Also, the pump head can stop turning even when the motor is turning if the connection between the motor and pump head fails mechanically. This has been shown to happen when the steel motor shaft strips the indexing feature in the plastic hub portion of the pump head. Any of these events would result in a stoppage in the flow, also known as stagnation, of the fluid stream in the flowpath of the water analyzer. Accordingly, a need exists for detecting the stagnation of the fluid stream in the flowpath of a water analyzer.

The present invention addresses one or more of these needs.

The fluid flowpath 10 as shown in the example embodiment now described with reference to FIG. 1, employs the use of one self-heated thermistor 150. In this embodiment of a single stream water analyzer 5, the fluid flowpath 10 is comprised of an inlet 15, first conductivity cell 20, UV reactor 25, second conductivity cell 30, thermistor 150, pump 35, and drain 40. In operation, the fluid stream enters the fluid flowpath 10 at inlet 15, travels downstream through first conductivity cell 20 where a first conductivity measurement is taken, through UV reactor 25 which oxidizes all organic carbon in the sample fluid stream, through second conductivity cell 30 which takes a second conductivity measurement. After exiting second conductivity cell 30, fluid stream flows by thermistor 150, which in this embodiment is located upstream of pump 35. Pump 35 pulls the fluid stream through flowpath 10. After exiting pump 35, the fluid stream is directed to drain 40. It is contemplated that, without departing from the scope of the invention, pump 35 encompasses any type of pump that can be used in a water analyzer including, but not limited to, a peristaltic pump, syringe pump, or centrifugal pump.

The fluid flowpath 10 as shown in another example embodiment now described with reference to FIG. 2, employs the use of one self-heated thermistor 150. In this embodiment of a single stream water analyzer 5, the fluid flowpath 10 is comprised of an inlet 15, first conductivity cell 20, UV reactor 25, second conductivity cell 30, thermistor 150, pump 35, and drain 40.

In operation, the fluid stream enters the fluid flowpath 10 at inlet 15, travels downstream through first conductivity cell 20 where a first conductivity measurement is taken, through UV reactor 25 which oxidizes all organic carbon in the sample fluid stream and, through second conductivity cell 30 which takes a second conductivity measurement. After exiting second conductivity cell 30, fluid stream enters pump 35, which pumps the fluid stream though flowpath 10. After exiting pump 35, fluid stream flows by thermistor 150 and is directed to drain 40.

Figure 3:
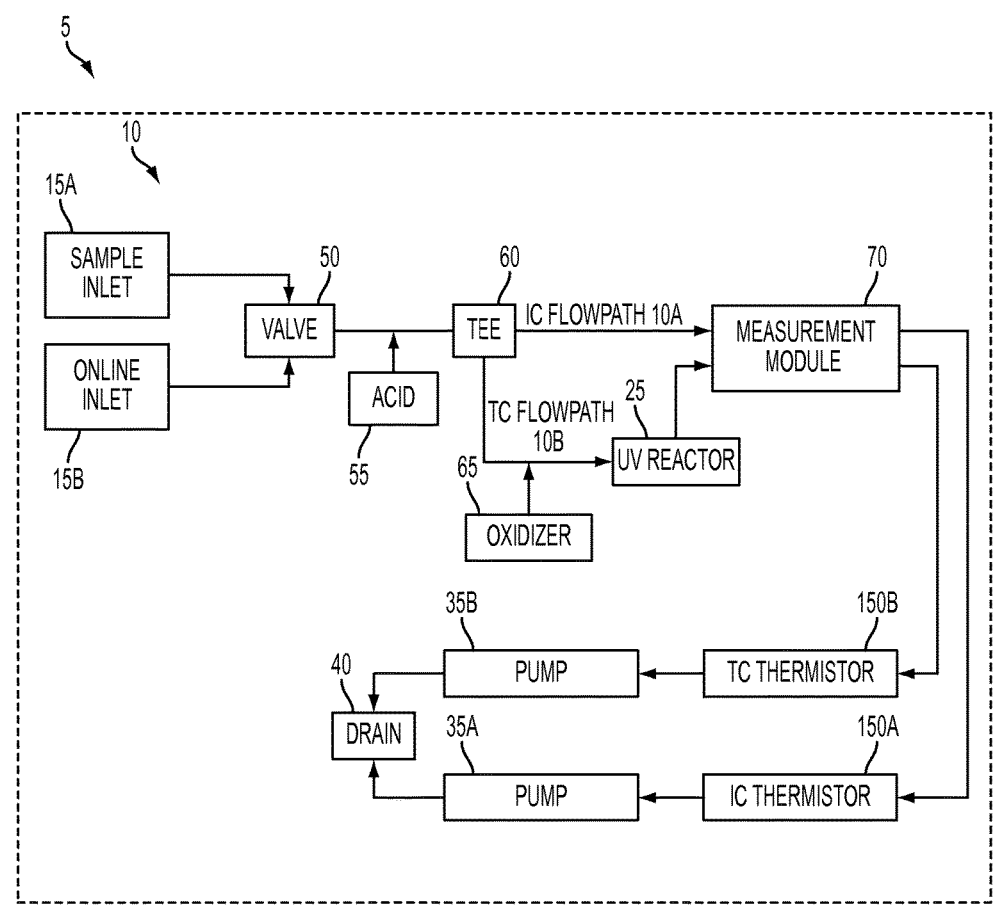
FIG. 3 illustrates the flowpath of a water analyzer employing a self-heated thermistor according to an embodiment of the present invention.

In FIG. 3, the two stream water analyzer 5 has a plurality of the fluid flowpaths, namely IC fluid flowpath 10A and TC fluid flowpath 10B. Each fluid flowpath 10A and 10B employ the use of one self-heated thermistor 150. The IC fluid flowpath 10A and TC fluid flowpath 10B each share a common path until they split at tee 60. Further, the sample fluid within both IC fluid flowpath 10A and TC fluid flowpath 10B is processed separately by measurement module 70. Additionally, the sample fluid within both IC fluid flowpath 10A and TC fluid flowpath 10B exits each respective flowpath into drain 40.

While sharing a common path, IC fluid flowpath 10A and TC fluid flowpath 10B are each comprised of sample inlet 15A, online inlet 15B, valve 50, and tee 60. IC fluid flowpath 10A is further comprised of measurement module 70, IC thermistor 150A, and IC pump 35A. TC fluid flowpath 10B is further comprised of measurement module 70, TC thermistor 150B, and TC pump 35B.

In operation, the fluid stream enters the water analyzer flowpath 10 at either one or both of sample inlet 15A or online inlet 15B and is directed to valve 50. In this embodiment, valve 50 is a three-way valve which passes the influent entering either sample inlet 15A or online inlet 15B downstream to tee 60. While the fluid stream is flowing between valve 50 and tee 60, acid is injected into the fluid stream by acid injection unit 55. Tee 60 directs a portion of the fluid stream along IC fluid flowpath 10A and the remainder of fluid stream along TC fluid flowpath 10B.

After tee 60, the contents of fluid stream flowing along IC fluid flowpath 10A are measured in measurement module 70 before flowing by IC thermistor 150A, which contacts the contents of sample fluid stream. After flowing by IC thermistor 150A, the fluid stream enters pump 35. After exiting pump 35, the fluid stream is directed to drain 40.

After tee 60, an oxidizing agent is added to the fluid stream flowing along TC fluid flowpath 10B by oxidizer injection unit 65, after which the contents of fluid stream are then measured in measurement module 70. The contents of the fluid then flow downstream by IC thermistor 150A, which contacts the contents of fluid stream. After flowing by IC thermistor 150A, the fluid stream enters pump 35. After exiting pump 35, the fluid stream is directed to drain 40.

Figure 2:
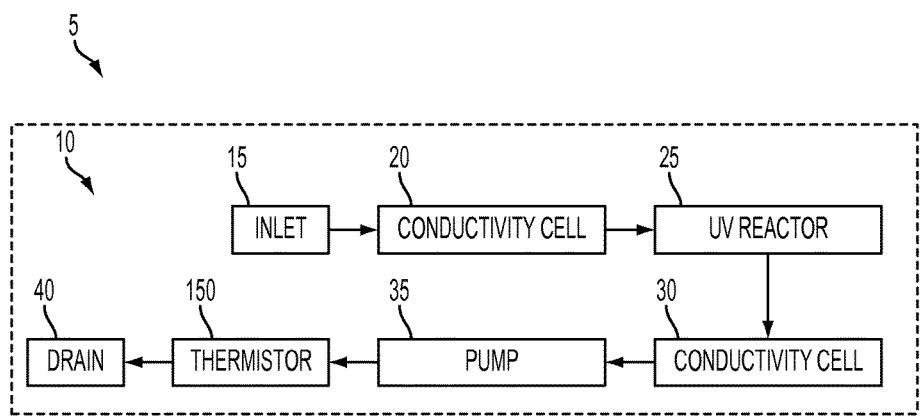
FIG. 2 illustrates the flowpath of a water analyzer employing a self-heated thermistor according to an embodiment of the present invention.

As can be seen from FIGS. 1-3, each flowpath 10 is comprised of at least an inlet 15, pump 35, and thermistor 150. It is understood that thermistor 150 can be located either upstream of downstream from pump 35. Thermistor 150 is in contact with the contents of flowpath 10, such as the fluid and/or air bubbles travelling through flowpath 10.

Most preferably, thermistor 150 is located adjacent to pump 35, either directly upstream or downstream from pump 35 with no intervening components between thermistor 150 and pump 35, such as measurement module 70 or conductivity cell 30.

Figure 4A:
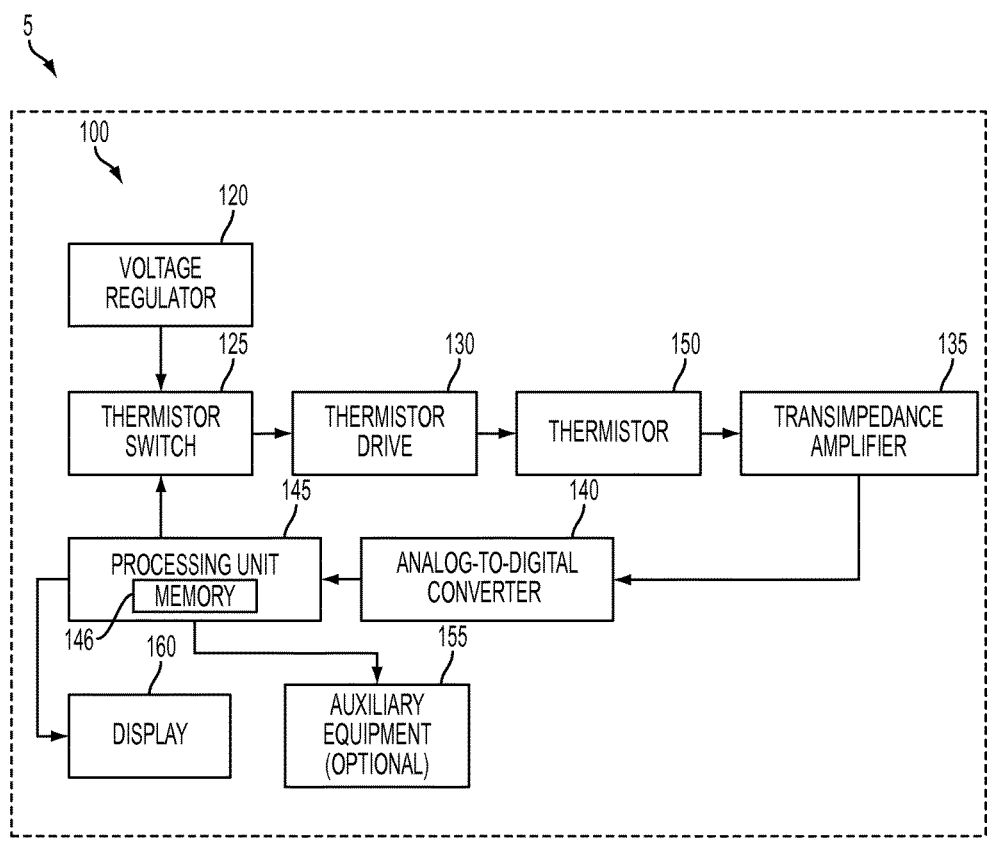
FIG. 4A illustrates a constant voltage flow sensor circuit employing a self-heated thermistor for a single flowpath according to an embodiment of the present invention.

The flow sensor circuit 100 as shown in the example embodiment now described with reference to FIG. 4A is a constant voltage thermistor circuit that employs one self-heated thermistor 150 for one flowpath. Thermistor 150 is positioned to contact the fluid flowing through flowpath 10. When the hot thermistor 150 comes into contact with a fluid, the fluid draws heat from thermistor 150, lowering the temperature of thermistor 150, and thus raising the resistance of thermistor 150.

In this embodiment, flow sensor circuit 100 is further comprised of voltage regulator 120, thermistor switch 125, thermistor drive 130, transimpedance amplifier 135, analog-to-digital converter 140, processing unit 145, display 160, and optional auxiliary equipment 155. In this embodiment, the constant voltage source is comprised of voltage regulator 120, thermistor switch 125, and thermistor drive 130. It is contemplated that one or more of voltage regulator 120, thermistor switch 125, and thermistor drive 130 can be combined into a single component.

Further, it is contemplated that in other embodiments, processing unit 145 can be a field programmable gate array, microprocessor, microcontroller, programmable logic controller, or another type of controller with similar functionality. Processing unit 145 has memory 146. Further, it is contemplated that a person having ordinary skill in the art may choose to use a processing unit 145 that also functions as analog-to-digital converter 140.

In operation, thermistor switch 125 receives a signal from processing unit 145, which enables processing unit 145 to control thermistor switch 125. When thermistor switch 125 receives a high signal from processing unit 145, thermistor switch 125 passes the voltage produced by voltage regulator 120 to thermistor drive 130, which applies a precision voltage to thermistor 150 located in thermistor housing 500 sufficient to heat thermistor 150. In one embodiment, the thermistor drive 130 is a precision op-amp. The resistance of thermistor 150 varies significantly with the temperature and contents of the fluid in thermistor housing 500, more so than the standard resistor.

Transimpedance amplifier 135 measures the amount of current flowing through thermistor 150 and produces a voltage that is representative of the amount of current flowing through thermistor 150. The voltage produced by transimpedance amplifier 135 is digitized by analog-to-digital converter 140 before being passed to processing unit 145.

Since the voltage produced by transimpedance amplifier 135 is representative of the amount of current flowing through thermistor 150, processing unit 145 is able to determine the amount of current flowing through thermistor 150 based on the digitized transimpedance amplifier voltage value. Further, since voltage regulator 120 applies a known voltage value to thermistor 150, processing unit 145 uses Ohm's law to calculate the resistance of thermistor 150 (V=IR, wherein V is the voltage applied to thermistor 150 by voltage regulator 120, I is the amount of current flowing through thermistor 150, and R is the resistance of thermistor 150). Once the resistance of thermistor 150 is known, processing unit 145 calculates the temperature of thermistor 150 using the resistance-temperature curve of thermistor 150 defined by the equation $T=1/[A+B*\ln(R)+C*(\ln(R))^3]-273.15$ (R is the resistance of the thermistor in $\Omega$ calculated above using Ohm's law, T is the temperature of the thermistor in ° C.). A, B, and C are thermistor constants that change from thermistor to thermistor. In one embodiment, thermistor 150 is GE Thermometrics P/N P60AB103M-NT in which $A=1.1268\times10^{-3}$, $B=2.348\times10^{-4}$, and $C=8.282\times10^{-8}$.

Figure 4B:
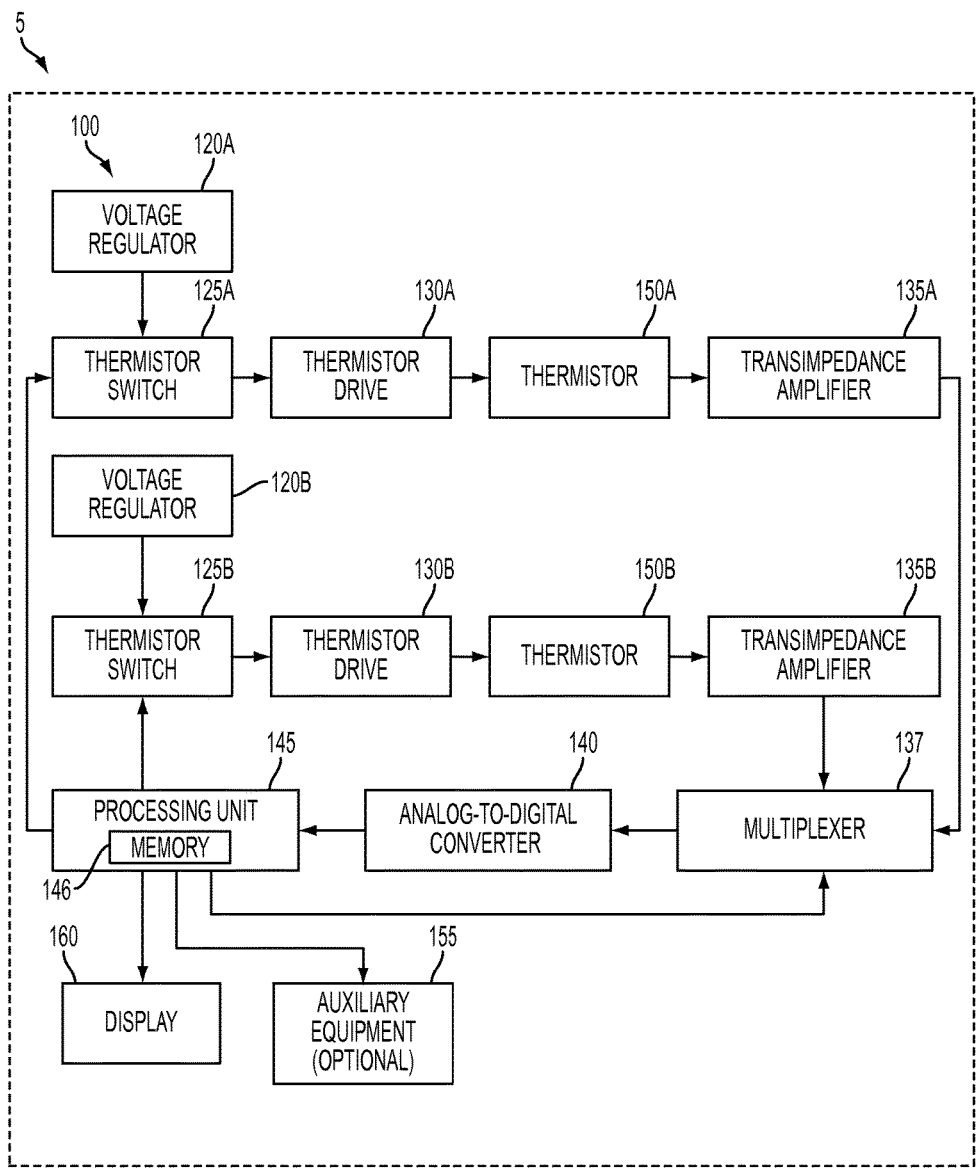
FIG. 4B illustrates a constant voltage flow sensor circuit employing self-heated thermistors for multiple flowpaths according to an embodiment of the present invention.

The flow sensor circuit 100 as shown in the example embodiment now described with reference to FIG. 4B is a constant voltage thermistor circuit that employs two self-heated thermistors 150A and 150B, each thermistor is in a separate flowpath. In one embodiment, thermistor 150A is employed as IC thermistor 150A in IC flowpath 10A and thermistor 150B is employed as TC thermistor 150B in TC flowpath 10B as shown in FIG. 3. Thermistors 150A and 150B are positioned to contact the fluid flowing through two different flowpaths. When the hot thermistors 150A and 150B come into contact with a fluid, the fluid draws heat from the thermistors 150A and 150B, lowering the temperature of the thermistors 150A and 150B, and thus raising the resistance of thermistors 150A and 150B.

In this embodiment, flow sensor circuit 100 is further comprised of voltage regulators 120A and 120B, thermistor switches 125A and 125B, thermistor drives 130A and 130B, transimpedance amplifiers 135A and 135B, multiplexer 137, analog-to-digital converter 140, processing unit 145, display 160, and optional auxiliary equipment 155. In this embodiment, the first constant voltage source is comprised of voltage regulator 120A, thermistor switch 125A, and thermistor drive 130A. The second constant voltage source is comprised of voltage regulator 120B, thermistor switch 125B, and thermistor drive 130B.

In operation, thermistor switches 125A and 125B receive a signal from processing unit 145, which enables processing unit 145 to control thermistor switches 125A and 125B. When thermistor switches 125A and 125B receive a high signal from processing unit 145, thermistor switches 125A and 125B pass the voltage produced by voltage regulators 120A and 120B to thermistor drives 130A and 130B, which applies a precision voltage to thermistors 150A and 150B located in thermistor housings 500 sufficient to heat thermistors 150A and 150B. In one embodiment, the thermistor drives 130A and 130B are precision op-amps. The resistance of thermistors 150A and 150B varies significantly with the temperature and contents of the fluid in thermistor housing 500, more so than the standard resistor.

Transimpedance amplifier 135A measures the amount of current flowing through thermistor 150A and produces a voltage that is representative of the amount of current flowing through thermistor 150A. Transimpedance amplifier 135B measures the amount of current flowing through thermistor 150B and produces a voltage that is representative of the amount of current flowing through thermistor 150B. The voltages produced by transimpedance amplifiers 135A and 135B are received by multiplexer 137, which alternatively passes the voltage produced by transimpedance amplifiers 135A or 135B to analog-to-digital converter 140 before being passed to processing unit 145. Processing unit 145 controls whether multiplexer 137 passes voltage from transimpedance amplifier 135A or 135B to analog-to-digital converter 140.

Since the voltage produced by transimpedance amplifiers 135A and 135B is representative of the amount of current flowing through thermistors 150A and 150B, processing unit 145 is able to determine the amount of current flowing through each of thermistor 150A and 150B based on the digitized transimpedance amplifier voltage value. Further, since voltage regulators 120A and 120B apply a known voltage value to thermistors 150A and 150B, processing unit 145 uses Ohm's law to calculate the resistance of thermistors 150A and 150B (V=IR, wherein V is the voltage applied to thermistors 150A or 150B by voltage regulator 120A or 120B, I is the amount of current flowing through thermistors 150A or 150B, and R is the resistance of thermistors 150A or 150B). Once the resistance of thermistors 150A and 150B is known, processing unit 145 calculates the temperature of thermistors 150A and 150B using the resistance-temperature curve of thermistors 150A and 150B defined by the equation $T=1/[A+B*\ln(R)+C*\ln(R))^3]-273.15$ (R is the resistance of the thermistor in $\Omega$ calculated above using Ohm's law, T is the temperature of the thermistor in ° C.). A, B, and C are thermistor constants that change from thermistor to thermistor. In one embodiment, thermistors 150A and 150B are GE Thermometrics P/N P60AB103M-NT in which $A=1.1268\times10^{-3}$, $B=2.348\times10^{-4}$, and $C=8.282\times10^{-8}$.

Figure 5A:
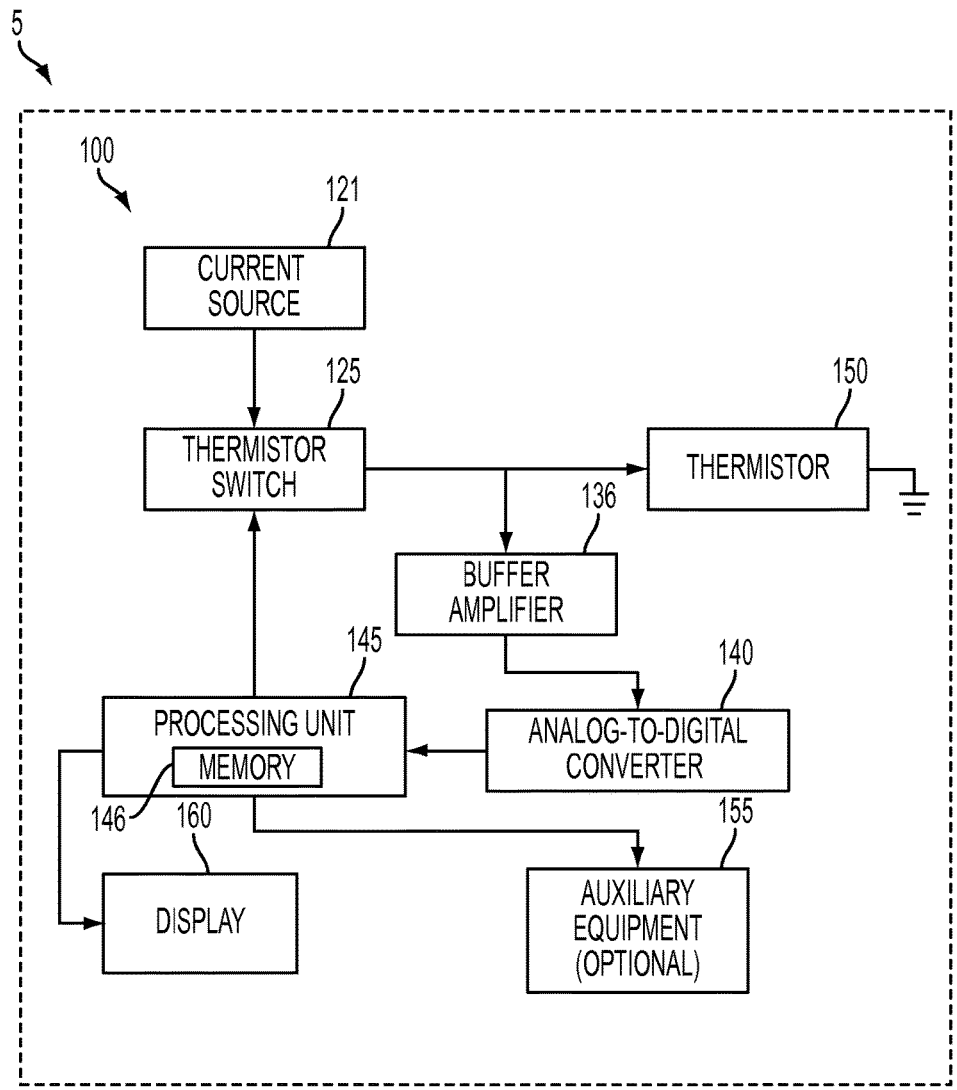
FIG. 5A illustrates a constant current flow sensor circuit employing a self-heated thermistor for a single flowpath according to an embodiment of the present invention.

The flow sensor circuit 100 as shown in the example embodiment now described with reference to FIG. 5A is a constant current thermistor circuit that employs one self-heated thermistor 150 for one flowpath. Thermistor 150 is positioned to contact the fluid flowing through the flowpath 10. In this embodiment, flow sensor circuit 100 is comprised of current source 121, thermistor switch 125, thermistor 150, buffer amplifier 136, analog-to-digital converter 140, processing unit 145, display 160, and optionally auxiliary equipment 155. In this embodiment, the constant current source is comprised of current source 121 and thermistor switch 125. It is contemplated that current source 121 and thermistor switch 125 can be combined in a single component.

In operation, thermistor switch 125 receives a signal from processing unit 145, which enables processing unit 145 to control thermistor switch 125. When thermistor switch 125 receives a high signal from processing unit 145, thermistor switch 125 passes the current produced by constant current source 121 to thermistor 150. The current passes through thermistor 150 and proceeds to ground. The current flowing through thermistor 150 produces a measurable voltage drop across thermistor 150. Buffer amplifier 136 is a unity gain amplifier which passes the value of the voltage drop across thermistor 150 to analog-to-digital converter 140. Analog-to-digital converter 140 digitizes the value of the voltage drop across thermistor 150 and passes it to processing unit 145.

Since current source 121 energizes thermistor 150 by providing a constant current value to thermistor 150 and the voltage drop across thermistor 150 is measurable and provided by buffer amplifier 136, processing unit 145 uses Ohm's law to calculate the resistance of thermistor 150 (V=IR, wherein V is the voltage drop across thermistor 150, I is the amount of current provided to thermistor 150 by constant current source 121, and R is the resistance of thermistor 150). Once the resistance of thermistor 150 is known, processing unit 145 calculates the temperature of thermistor 150 using the resistance-temperature curve of thermistor 150 defined by the equation $T=1/[A+B*\ln(R)+C*\ln(R))^3]-273.15$ (R is the resistance of the thermistor in Ω calculated above using Ohm's law, T is the temperature of the thermistor in ° C.). A, B, and C are thermistor constants that change from thermistor to thermistor.

Processing unit 145 examines the slope of the leading edge for each rise in temperature of thermistor 150 to determine the state of the fluid stream in the flowpath 10 of water analyzer 5. Flowing fluid removes the heat more rapidly than stagnant fluid from thermistor 150, for example, resulting in a different temperature-versus-time curve. Similarly, air removes heat much more slowly than fluid, so the presence of air at thermistor 150 can be detected.

Figure 5B:
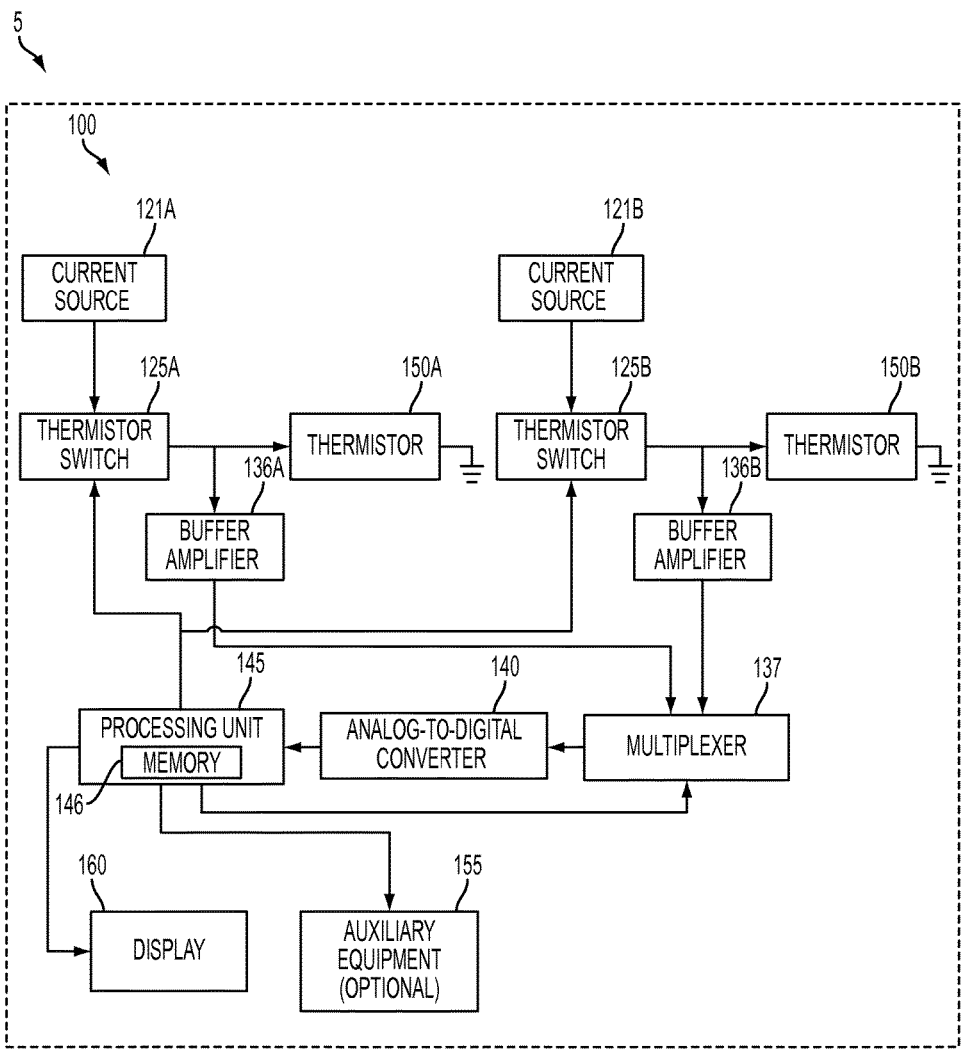
FIG. 5B illustrates a constant current flow sensor circuit employing self-heated thermistors for multiple flowpaths according to an embodiment of the present invention.

The flow sensor circuit 100 as shown in the example embodiment now described with reference to FIG. 5B is a constant current thermistor circuit that employs one self-heated thermistor 150A and 150B for each flowpath. In one embodiment, thermistor 150A is employed as IC thermistor 150A in the IC flowpath 10A and thermistor 150B is employed as TC thermistor 150B in TC flowpath 10B as shown in FIG. 3. Thermistors 150A and 150B are positioned to contact the fluid flowing through the two different flowpaths. When the hot thermistors 150A and 150B come into contact with the fluid, the fluid draws heat from the thermistors 150A and 150B, lowering the temperature of the thermistors 150A and 150B, and thus raising the resistance of thermistors 150A and 150B.

In this embodiment, flow sensor circuit 100 is comprised of current sources 121A and 121B, thermistor switches 125A and 125B, thermistors 150A and 150B, buffer amplifiers 136A and 136B, multiplexer 137, analog-to-digital converter 140, processing unit 145, display 160, and optionally auxiliary equipment 155. In this embodiment, the first constant current source is comprised of current source 121A and thermistor switch 125A. It is contemplated that current source 121A and thermistor switch 125A can be combined in a single component. Further, the second constant current source is comprised of current source 121B and thermistor switch 125B. It is contemplated that current source 121B and thermistor switch 125B can be combined into a single component.

In operation, thermistor switches 125A and 125B receive a signal from processing unit 145, which enables processing unit 145 to control thermistor switches 125A and 125B. When thermistor switches 125A and 125B receive a high signal from processing unit 145, thermistor switches 125A and 125B pass the current produced by constant current source 121A to thermistor 150A and current produced by constant current source 121B to thermistor 150B. The current passes through thermistors 150A and 150B and proceeds to ground. The current flowing through thermistors 150A and 150B produces a measurable voltage drop across thermistors 150A and 150B. Buffer amplifiers 136A and 136B are unity gain amplifiers which pass the value of the voltage drop across thermistor 150A and 150B to multiplexer 137, which alternatively passes the voltage produced by buffer amplifiers 136A or 136B to analog-to-digital converter 140 before being passed to processing unit 145. Processing unit 145 controls whether multiplexer 137 passes voltage from buffer amplifier 136A or 136B to analog-to-digital converter 140.

Since current sources 121A and 121B energize thermistors 150A and 150B by providing a constant current value to thermistors 150A and 150B, and the voltage drop across thermistors 150A and 150B is measurable and provided by buffer amplifier 136, processing unit 145 uses Ohm's law to calculate the resistance of thermistors 150A and 150B (V=IR, wherein V is the voltage drop across thermistor 150, I is the amount of current provided to thermistor 150 by constant current source 121, and R is the resistance of thermistor 150). Once the resistance of thermistors 150A and 150B is known, processing unit 145 calculates the temperature of thermistors 150A and 150B using the resistance-temperature curve of thermistors 150A and 150B defined by the equation $T=1/[A+B*\ln(R)+C*\ln(R))^3]-273.15$ (R is the resistance of the thermistor in Ω calculated above using Ohm's law, T is the temperature of the thermistor in ° C.). A, B, and C are thermistor constants that change from thermistor to thermistor and are stored in memory 146 of processing unit 145. Further, processing unit 145 also stores the calculated temperature data in memory 146.

In FIGS. 4A-5B processing unit 145 retrieves the calculated temperature data from memory 146 and examines the slope of the leading edge for each rise in temperature of thermistor 150 (or thermistors 150A and 150B) to determine the state of the fluid stream (or streams) in the flowpath 10 (or flowpaths 10A, 10B) of water analyzer 5. Flowing fluid removes the heat more rapidly than stagnant fluid from thermistor 150, for example, resulting in a different temperature-versus-time curve. Similarly, air removes heat much more slowly than fluid, so the presence of air at thermistor 150 can be detected.

In one embodiment, processing unit 145 examines the slope of the leading edge for each rise in temperature of thermistor 150 by obtaining multiple samples of the temperature of thermistor 150, storing the samples in memory 146, subdividing the samples into groups, using linear regression (y=mx+b) to obtain the slope of the temperature data for each group, storing the slopes in memory 146, and characterizing the slopes by comparing the slope of the temperature data for each group with known slope values stored in memory 146 that are discussed below indicate various fluid states. A fluid state is deemed to be present if the temperature slope data for multiple successive groups indicates the presence of the same fluid state. In one embodiment, the sample rate is 100 samples/second and the samples are subdivided into groups of 10 samples. Further, in this embodiment, a fluid state is deemed to be present if the temperature slope data for three successive groups indicate the presence of the same fluid state. However, it is contemplated that, without departing from the scope of the invention, other embodiments may use a different sample rate, subdivide the samples into groups of a different size, and deem that a fluid state is present once a different number of successive groups are identified as having the same fluid state.

In another embodiment, processing unit 145 examines the slope of the leading edge for each rise in temperature of thermistor 150 by obtaining a group of samples of the temperature of thermistor 150, storing the samples in memory 146, using linear regression (y=mx+b) to obtain the slope of the temperature data for the obtained samples, storing the slope in memory 146, and characterizing the slope by comparing the slope of the temperature data for the group with known slope values stored in memory 146 that are discussed below indicating various fluid states. A fluid state is deemed to be present if the temperature slope data for multiple successive groups indicates the presence of the same fluid state. In one embodiment, the sample rate is 100 samples/second and each group is 100 samples. Further, in this embodiment, a fluid state is deemed to be present if the temperature slope data for three successive groups indicate the presence of the same fluid state. However, it is contemplated that, without departing from the scope of the invention, other embodiments may use a different sample rate, use a different group size, and deem that a fluid state is present once a different number of successive groups are identified as having the same fluid state.

Under normal fluid flowpath state conditions, when thermistor 150 is energized by either the constant current source or the constant voltage source, the slope of the leading edge for each rise in temperature of thermistor 150 is between about 1.56±0.54° C./sec. Further, under stagnant fluid flowpath state conditions, when thermistor 150 is energized, the slope of the leading edge for each rise in temperature of thermistor 150 is between about 1.13+0.63,−0.19° C./sec. Additionally, under fluid flowpath state conditions in which the fluid is flowing, but contains intermittent air bubbles, the slope of the leading edge for each rise in temperature of thermistor 150 is between about 2.93+1.02,−0.057° C./sec. Once processing unit 145 determines the state of the fluid in the flowpath 10, processing unit 145 displays the state on display 160 for the user.

Knowledge of the state of the fluid flowpath 10, more particularly the fluid in fluid flowpath 10, is useful to verify that reported water analysis measurements are accurate (for example TOC value in a TOC analyzer), that clogs or leaks are not present in the flowpath of the water analyzer 5, that the water analyzer pumps 35 are functioning properly, etc. The state of the fluid in the flowpath 10 can also be very helpful in troubleshooting water analyzer failures (e.g. clog, leaks, etc.).

Further, some water analyzers which measure TOC use a routine that automatically adjusts oxidizer flow rate to find the optimum for a particular sample fluid. When the oxidizer flow rate is too high, extra oxygen bubbles are generated that adversely affect the proper reporting of TOC. It is contemplated that in some embodiments of flow sensor circuit 100, processing unit 145 interfaces with auxiliary equipment 155, such as an oxidizer, and can pass along pertinent information to the auxiliary equipment regarding the state of the fluid in the fluid flowpath 10. This invention can be used to improve the automatic adjustment of oxidizer flow rate, because it is capable of detecting bubbles in the fluid of the water analyzer fluid flowpath 10.

Figure 6:
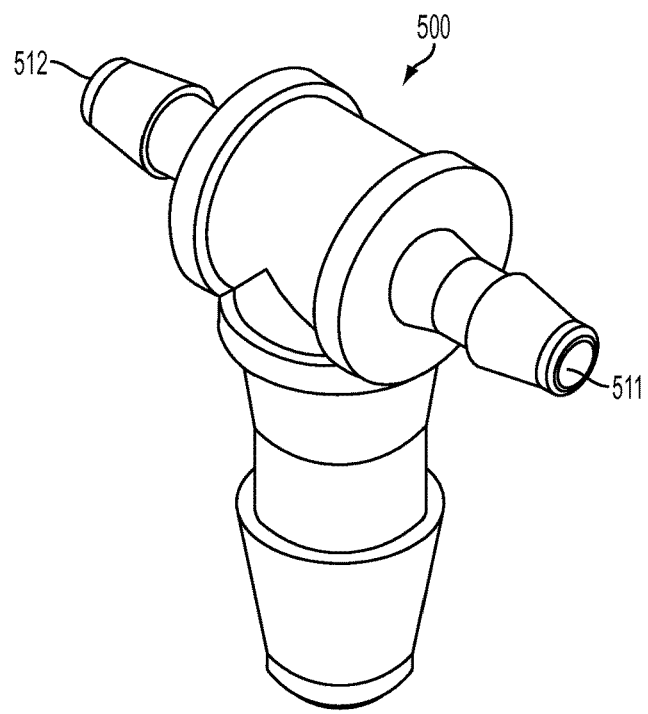
FIG. 6 illustrates a housing for a self-heated thermistor according to an embodiment of the present invention.
Figure 7:
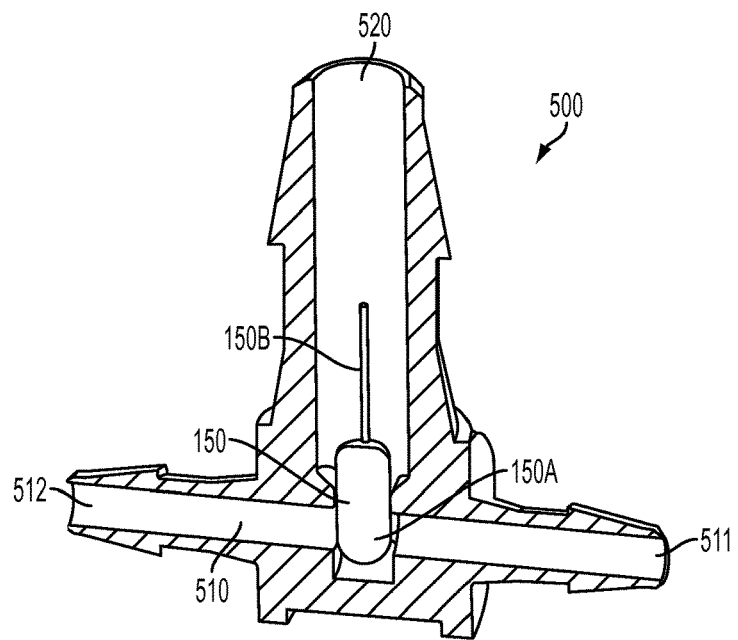
FIG. 7 illustrates a housing for a self-heated thermistor according to an embodiment of the present invention.

Turning to FIGS. 6 and 7, it is contemplated that thermistor 150 is located in a thermistor housing 500 having a conduit 510 with an inlet 511 and outlet 512 through which the fluid will flow when placed in a flowpath. Thermistor housing 500 also has a sealed thermistor feedthrough 520, which positions the head 150a of thermistor 150 in the fluid stream flowing through the flowpath, while providing a sealed passageway for the electrical leads 150b of thermistor 150. While FIGS. 6 and 7 show one possible embodiment of thermistor housing 500, it is contemplated that a person having ordinary skill in the art can choose to use other thermistor housing configurations having a conduit 510 and thermistor feedthrough 520.

The effectiveness of the thermistor 150 and flow sensor circuit 100 in a constant voltage configuration is demonstrated in the experimental results of FIGS. 8-12. In the experiment a 10 kΩ thermistor was tested to determine the feasibility of utilizing a thermistor to detect the state of fluid flowing in a fluid flowpath 10, such as the flowpath of a water analyzer 5. The thermistor temperature response to 50V being delivered to thermistor 150 from a regulated voltage source was monitored in normal water flow, stagnant water flow, and water flow containing air bubbles. Water flow was controlled with a peristaltic pump and was maintained at 300 μL/min during normal water flow conditions. The results for five tests are discussed below.

Figure 8:
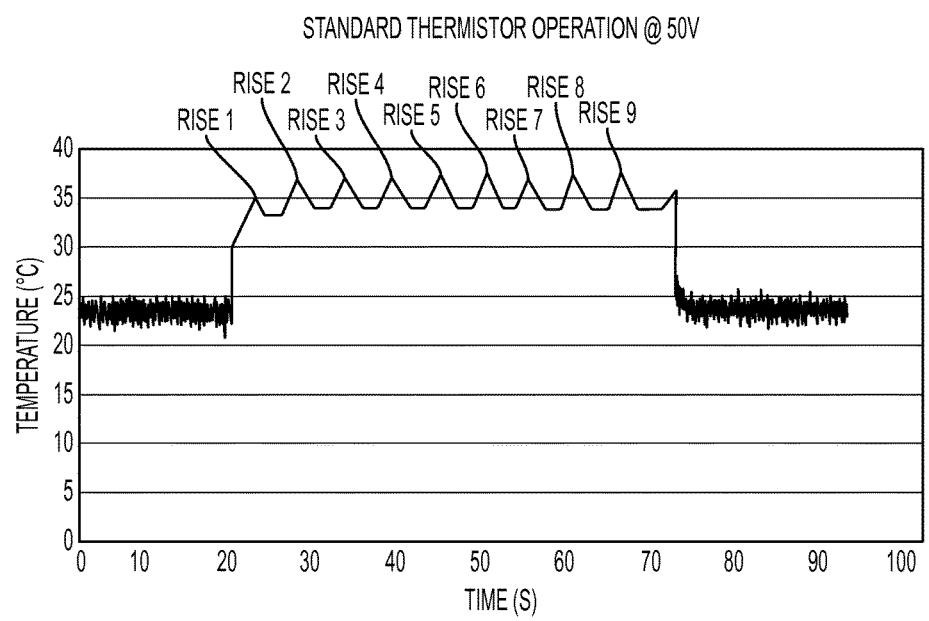
FIG. 8 illustrates the temperature response of a thermistor under normal water flow conditions through a water analyzer according to an embodiment of the present invention.

FIG. 8 illustrates the temperature response of thermistor 150 when voltage was applied for 1 minute under normal water flow conditions. Plot results show oscillations in thermistor temperature. This pattern of peaks in temperature occurs during the brief intervals during which convective heat transfer was reduced due to stagnant water. These stagnant water intervals were caused by the non-continuous water flow generated by the roller rotation signature of the peristaltic pump.

The slope of the leading edge for each rise in temperature of thermistor 150 was measured and the results are shown in Table 1 below. Units for this slope are ° C./second. Upon disregarding rise 7 as a statistical outlier, one can see that very consistent slope measurements for the leading edge of each rise were obtained under normal flow conditions of fluid flowpath 10.

TABLE 1

| Slope Measurements in Normal Flow Conditions | |
| --- | --- |
| Rise | Slope (° C./sec) |
| 1 | 1.98 |
| 2 | 1.92 |
| 3 | 1.63 |
| 4 | 1.24 |
| 5 | 1.83 |
| 6 | 1.75 |
| 7 | 1.02 |
| 8 | 1.30 |
| 9 | 1.36 |
| For All Rises | |
| Avg: | 1.56 |
| Min: | 1.02 |
| Max: | 1.98 |
| For All Rises Except 7 | |
| Avg: | 1.63 |
| Min: | 1.24 |
| Max: | 1.98 |
| Range: | 1.63 + 0.35, −0.39 |

Figure 9:
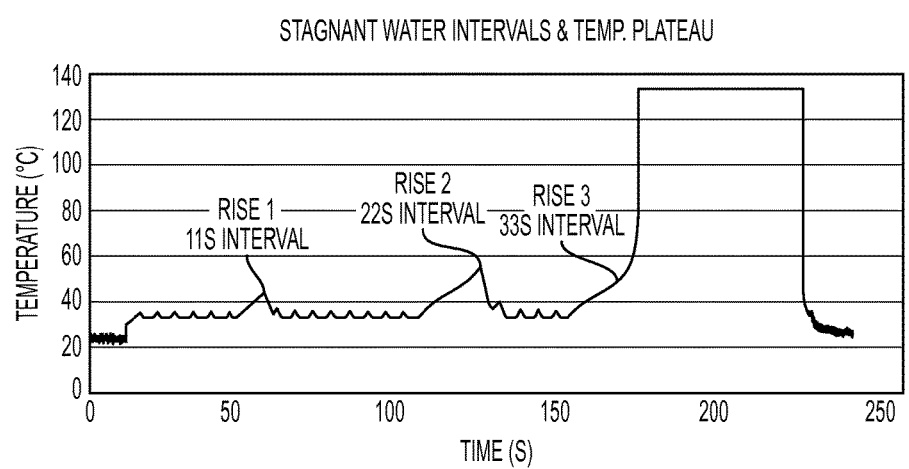
FIG. 9 illustrates the temperature response of a thermistor under intervals of stagnant fluid flow conditions through a water analyzer according to an embodiment of the present invention.

FIG. 9 illustrates the temperature response of thermistor 150 when voltage is applied to thermistor 150 under stagnant water conditions of fluid flowpath 10. In this test, voltage was applied to thermistor 150 initially during normal water flow conditions of fluid flowpath 10. The peristaltic pump was turned off during three intervals to simulate stagnant water for 11 seconds, 22 seconds, and 33 seconds respectively. The slope of the leading edge for each rise in temperature of thermistor 150 was measured and the results are shown in Table 2 below.

As can be seen in FIG. 9 and in Table 2 below, the temperature rise curves in stagnant water were nonlinear during the "Rise 2" and "Rise 3" intervals, closely resembling a cubic function. Additionally, one can also observe that the average slope of the leading edge for each rise in temperature of thermistor 150 during stagnant water conditions of fluid flowpath 10 due to normal peristaltic pump behavior and no pump action were within the same range of values.

TABLE 2

| Slope Measurements of Stagnant Water Intervals | |
|---|---|
| Rise | Slope (° C./sec) |
| 1 | 1.13 |
| 2 | 1.04 |
| 3 | 1.04 |
| Avg: | 1.07 |
| Min: | 1.04 |
| Max: | 1.13 |

Figure 10:
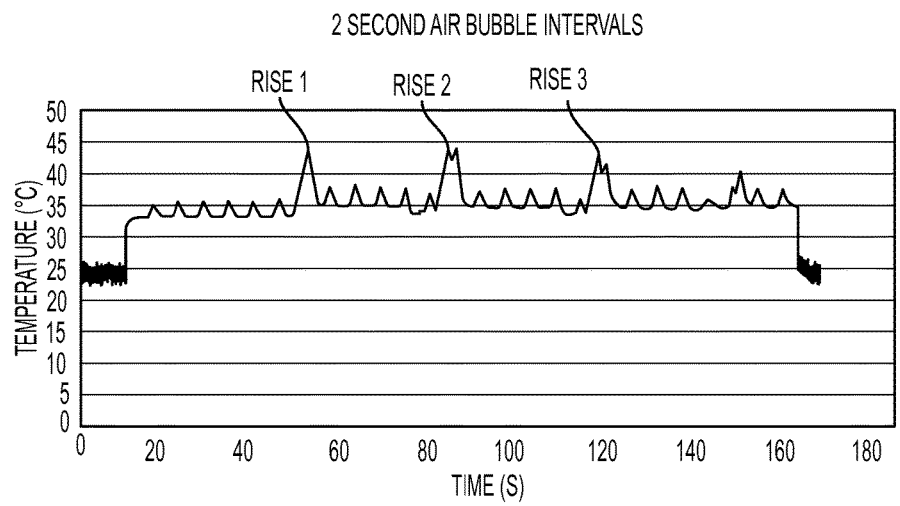
FIG. 10 illustrates the temperature response of a thermistor when intervals of air bubbles enter the fluid flowing through a water analyzer according to an embodiment of the present invention.

FIG. 10 illustrates the temperature response of thermistor 150 when air bubbles are present in the sample water flowing through the flowpath 100 of water analyzer 5. In this test, voltage was applied to thermistor 150 under initial normal water flow conditions of fluid flowpath 10, then a valve was opened to introduce air flow during three 2 second intervals, which simulated the presence of air bubbles in the sample water flowing through the water analyzer flowpath 100. The slope of the leading edge for each rise in temperature of thermistor 150 was measured and the results are shown in table 3 below.

As can be seen in FIG. 10 and Table 3 below, the air bubble rise curves seem to approach a more linear behavior than stagnant water rise curves. The average slope of the leading edge for each rise in temperature of thermistor 150 in an air environment is significantly steeper than the average slope of the leading edge for each rise in temperature of thermistor 150 observed in stagnant water environments.

TABLE 3

| Slope Measurements of 2 s Air Bubble Intervals | |
|---|---|
| Rise | Slope (° C./sec) |
| 1 | 2.69 |
| 2 | 3.16 |
| 3 | 3.29 |
| Avg: | 3.05 |
| Min: | 2.69 |
| Max: | 3.29 |

Figure 11:
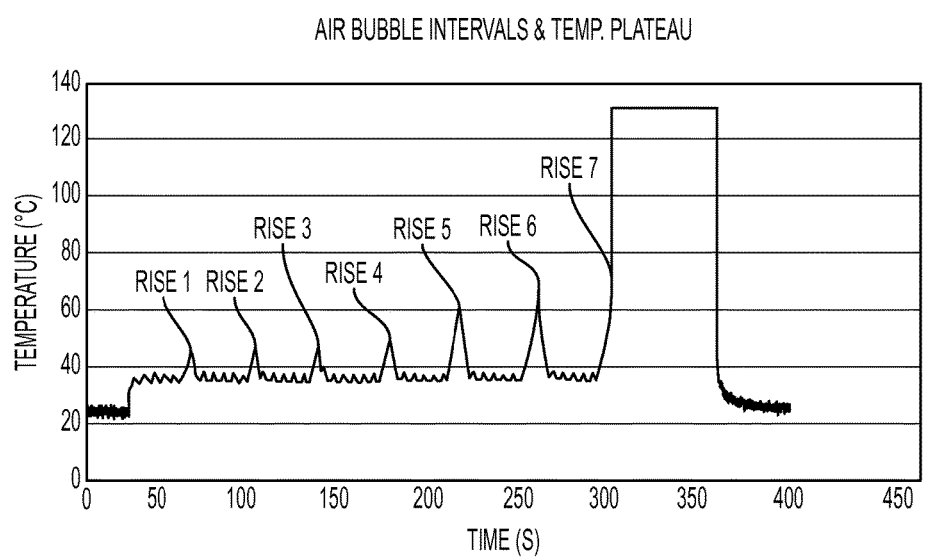
FIG. 11 illustrates the temperature response of a thermistor when intervals of air bubbles enter the fluid flowing through a water analyzer according to an embodiment of the present invention.

FIG. 11 is an additional illustration showing the temperature response of thermistor 150 when air bubbles are present in the fluid flowing through the water analyzer flowpath 100. Voltage was applied to thermistor 150 under initial normal water flow conditions, then a valve was opened to introduce air flow during three initial 5 s intervals, followed by 6 second, 7 second, 8 second, 9 second, and 10 second intervals to simulate air bubbles in the system. The slope of the leading edge for each rise in temperature of thermistor 150 was measured and the results are shown in Table 4 below.

As can be seen in FIG. 11 and Table 4 below, the measurement sample size of air bubble intervals collected in Table 4 is larger than that collected in Table 3, and thus, a wider range of slope values for leading edge of rises in temperature of thermistor 150 were measured. However, the slope of the leading edge for each rise in temperature of thermistor 150 during air bubble intervals in Table 4 remained within the same magnitude as those in Table 3.

TABLE 4

| Slope Measurements of Sequential Air Bubble Intervals | |
|---|---|
| Rise | Slope (° C./sec) |
| 1 | 2.93 |
| 2 | 2.70 |
| 3 | 2.63 |
| 4 | 2.36 |
| 5 | 3.05 |
| 6 | 2.86 |
| 7 | 3.95 |
| Avg: | 2.93 |
| Min: | 2.36 |
| Max: | 3.95 |

Figure 12:
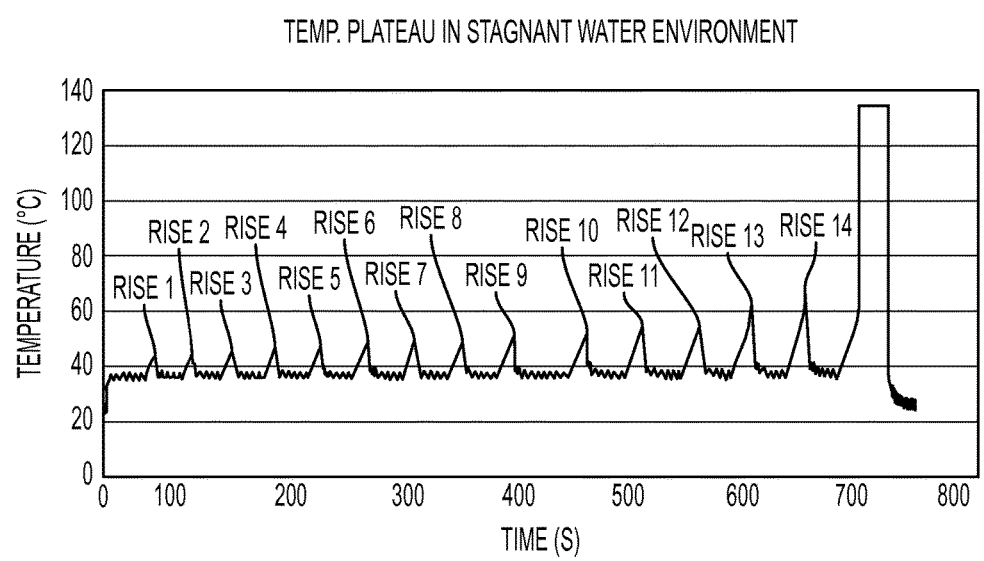
FIG. 12 illustrates the temperature response of a thermistor under intervals of stagnant fluid flow conditions through a water analyzer according to an embodiment of the present invention.

FIG. 12 illustrates the temperature response of thermistor 150 when air bubbles are present in the sample water flowing through the water analyzer flowpath 10. In this test, voltage was applied to thermistor 150 under initial normal water flow conditions of fluid flowpath 10. The peristaltic pump was turned off to simulate stagnant water for an initial 7 seconds, and sequentially increased the time by 1 second until the built in temperature limit of thermistor 150 was reached.

As can be seen, the measurement sample size of stagnant water intervals collected during this test shown in Table 5 is larger than that collected and shown in Table 2, and thus, a wider range of slope values for leading edge of rises in temperature of thermistor 150 were measured, though all values remained within the same magnitude upon disregarding rises 13-15, which were statistical outliers resulting from heating thermistor 150 for a substantially longer period of time than the rises at the beginning of the test.

TABLE 5

| Slope Measurements of Sequential Stagnant Water Intervals | |
|---|---|
| Rise | Slope (° C./sec) |
| 1 | 1.07 |
| 2 | 1.07 |
| 3 | 1.05 |
| 4 | 1.02 |
| 5 | 1.02 |
| 6 | 0.94 |
| 7 | 1.02 |
| 8 | 1.01 |
| 9 | 1.01 |
| 10 | 1.08 |
| 11 | 1.13 |
| 12 | 1.13 |
| 13 | 1.26 |
| 14 | 1.41 |
| 15 | 1.76 |
| For All Rises | |
| Avg: | 1.13 |
| Min: | 0.94 |
| Max: | 1.76 |
| For Rises 1-12 | |
| Avg: | 1.05 |
| Min: | 0.94 |
| Max: | 1.13 |
| Range: | 1.05 + 0.08, −0.11 |

The data shown in FIGS. 8-12 and Tables 1-5 gained from the tests presented above show a clear distinction between the temperature response of thermistor 150 during normal fluid flow conditions, stagnant fluid conditions, and when air is present in the water analyzer flowpath. This distinction is measurable and represented by the slope of the leading edge for each rise in temperature of thermistor 150 which differs between environments. In a normal fluid flowpath state or condition, the slope of the leading edge for each rise in temperature of thermistor 150 is between about 1.63+0.35−0.39° C./sec, under a stagnant fluid flowpath state or condition the slope of the leading edge for each rise in temperature of thermistor 150 is between about 1.05+0.08,−0.11° C./sec, and under a fluid flowpath state or condition in which air bubbles are present in the fluid the slope of the leading edge for each rise in temperature of thermistor 150 is between about 2.93+1.02,−0.057° C./sec.

Accordingly, the slope of the leading edge for each rise in temperature of thermistor 150 may be used to distinguishing among flowing fluid, stagnant fluid, and air in a fluid flowpath.

In another embodiment, the present invention is comprised of a method of sensing the flow rate of fluid in a fluid flowpath described above. The method comprises providing a self heated thermistor situated in a fluid flowpath, energizing the thermistor through the application of a voltage from a constant voltage source or current from a constant current source to thermistor that is sufficient to heat the thermistor, sensing each rise in temperature of the energized thermistor, calculating the slope of the leading edge for each rise in temperature of the energized thermistor, and equating the slope of the leading edge for each rise in temperature of the energized thermistor with the state of the fluid flowing through the fluid flowpath.

The thermistor circuit is configured to examine the slope of the leading edge for each rise in temperature of the thermistor to determine whether the fluid in the fluid flowpath is flowing normally, stagnant, or contains air bubbles. The temperature of the thermistor is calculated by providing a processing unit with a representation of the amount of current flowing through the thermistor. The processing unit calculates the temperature of the thermistor using the amount of current flowing through the thermistor, the resistance value of the thermistor, and the temperature-resistance curve of the thermistor. The temperature-resistance curve is dictated by the formula $T=1/[A+B*\ln(R)+C*\ln(R))^3]-273.15$ (R is the resistance of the thermistor in Ω calculated above using Ohm's law, T is the temperature of the thermistor in ° C.). A, B, and C are thermistor constants that change from thermistor to thermistor.

In one embodiment, the fluid flowpath is the fluid flowpath of a water analyzer. The fluid flowpath is comprised of a pump adjacent to the thermistor. In one embodiment, the user of the water analyzer is informed as to whether the fluid in said fluid flowpath is flowing normally, stagnant, or contains air bubbles. Stated alternatively, the user is informed as to whether the fluid flowpath is in a normal fluid flow state (also called a fluid flow condition), a stagnant state (also called a stagnant condition), or an air bubbles state (also called an air bubbles condition).

In one embodiment, the temperature of the thermistor is calculated by providing a processing unit with a representation of the amount of current flowing through the thermistor; wherein the processing unit calculates the temperature of the thermistor using the resistance value of the thermistor and the temperature-resistance curve of the thermistor; wherein the processing unit calculates the resistance of the thermistor using Ohm's law, the amount of current flowing through the thermistor, and the voltage applied to the thermistor.

In another embodiment, the temperature of the thermistor is calculated by providing a processing unit with the voltage drop across the thermistor; wherein the processing unit calculates the temperature of the thermistor using the resistance value of the thermistor and temperature-resistance curve of the thermistor; wherein the processing unit calculates the resistance of the thermistor using Ohm's law, the amount of current flowing through the thermistor, and the voltage drop across the thermistor.

Figure 13:
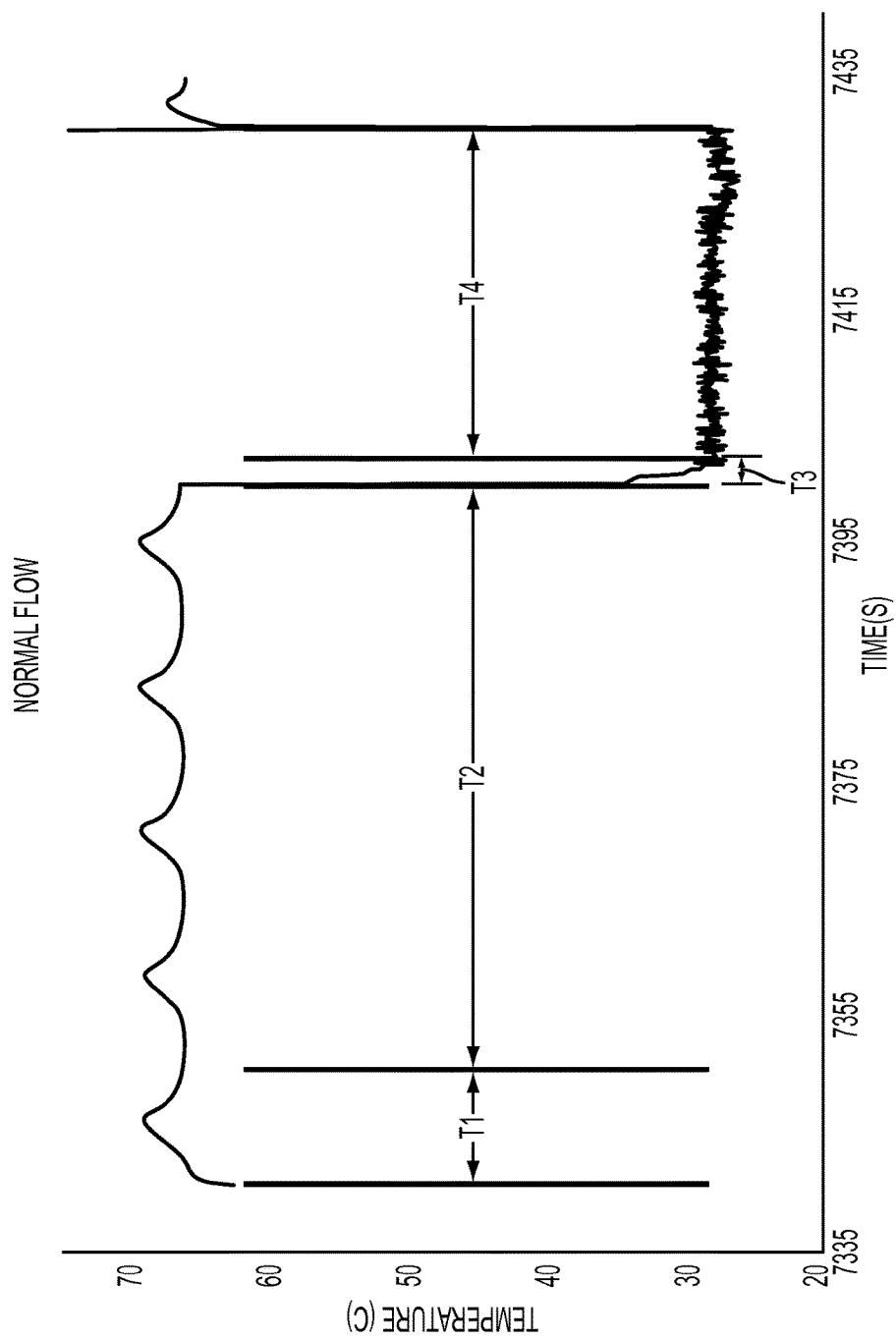
FIG. 13 illustrates the temperature response of a thermistor under normal water flow conditions through a water analyzer according to an embodiment of the present invention.

FIG. 13 depicts the temperature response of another embodiment of flow sensor circuit 100 which uses the average and standard deviation of multiple temperature measurements during time period T2 and T4 of the contents of flowpath 10 using thermistor 150 to determine whether flowpath 10 contains bubbles or is clogged, stopped, contains air, or flowing normally. The average and standard deviation of the measurements taken during T2 are calculated, the average and standard deviation of the measurements taken during T4 are calculated, and the calculated average and standard deviations during T2 and T4 are compared to the parameters listed in table 6 below to determine the state of the contents of flowpath 10. The available states for flowpath 10 in this embodiment are: contains bubbles or is clogged; contains air; stopped; or flowing normally.

In FIG. 13, the fluid is flowing normally through flowpath 10. High current was provided to thermistor 150 during time period T1. Temperature measurements were taken of thermistor 150 while providing high current to thermistor 150 during time period T2. Low current was provided to thermistor 150 during time period T3. Temperature measurements of thermistor 150 were taken while providing low current to thermistor 150 during time period T4.

The FIGS. 14A-D detail the program stored in the memory 146 of and the operations taking place within processing unit 145 of flow sensor circuit 100 while the data used to create FIG. 13 was being collected. For simplicity purposes, FIGS. 14A-D predominantly discuss one flowpath 10. However, it is understood that when both TC flowpath 10B and IC flowpath 10A are present in water analyzer 5, the operations shown in FIGS. 14A-D are simultaneously carried out for both flowpaths.

Figure 14A:
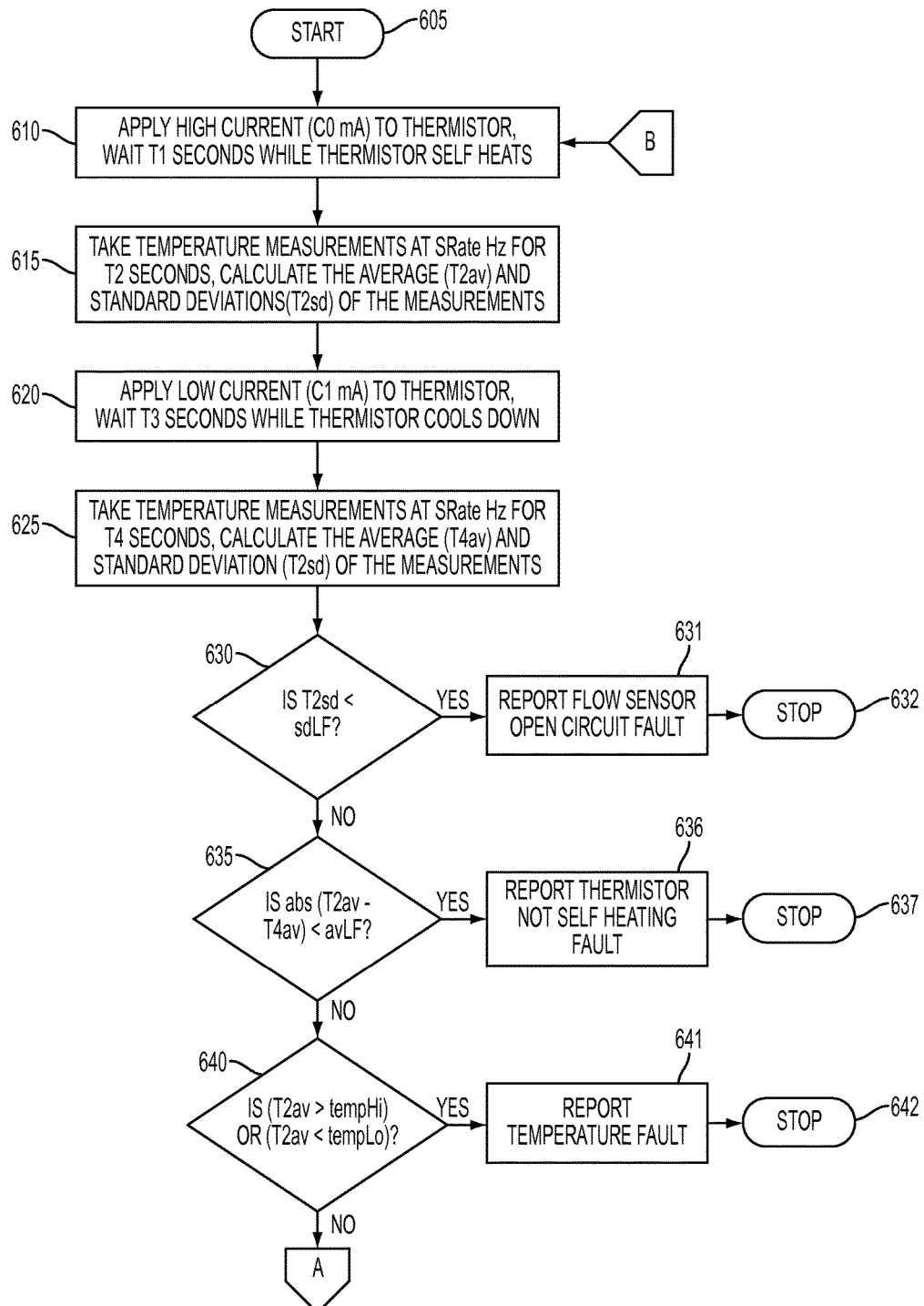
FIGS. 14A-D are flowcharts of the program stored in the memory of processing unit and executed by processing unit according to an embodiment of the present invention.
Figure 14B:
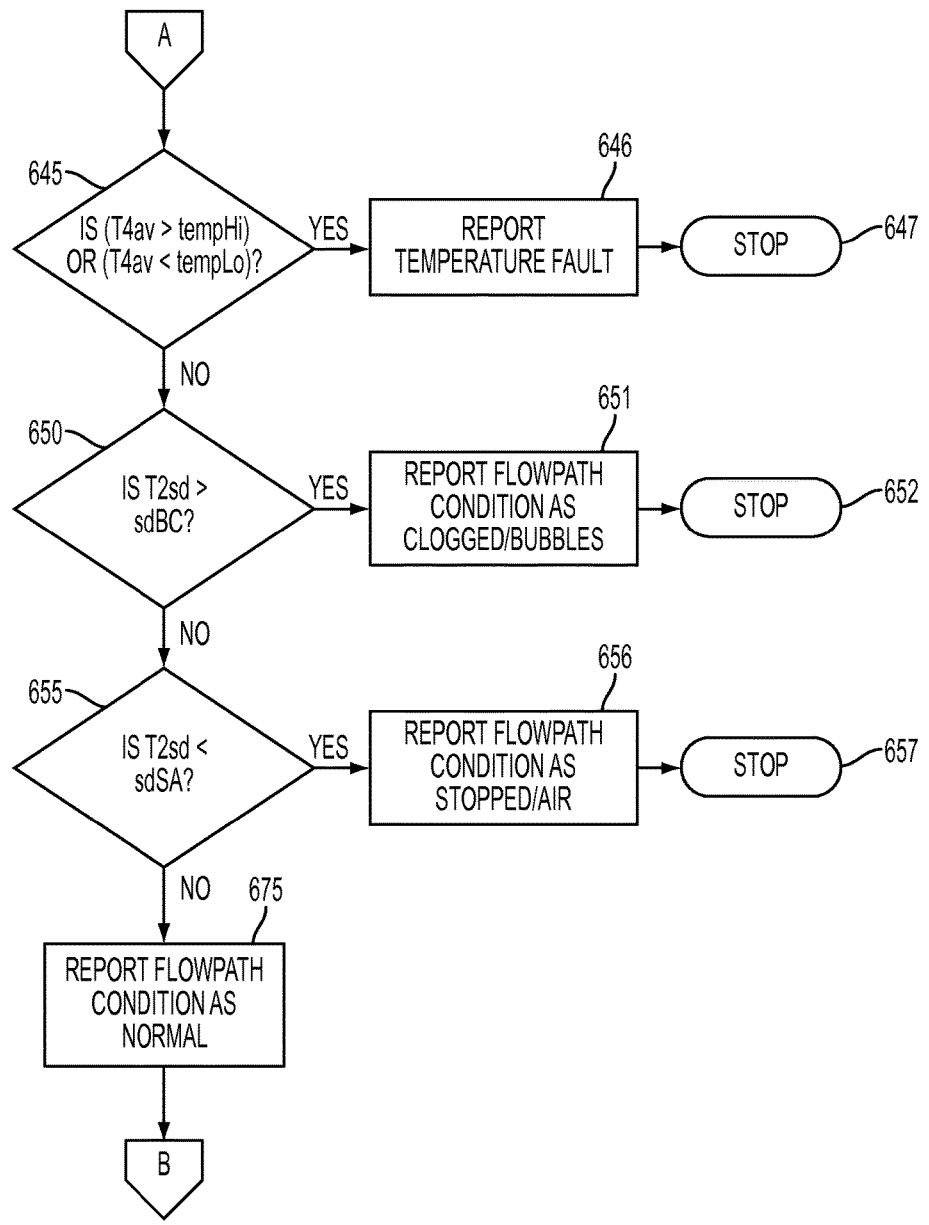

As can be seen, FIGS. 14A and B form one embodiment of the program, FIGS. 14A and C form another embodiment of the program, and FIGS. 14A and D form another embodiment of the program. It is contemplated that elements from the aforementioned embodiments can be interchanged without departing from the scope of the present invention.

In FIGS. 14A-D, the table below contains exemplary values for the parameters stored in the memory 146 of processing unit 145 of an embodiment of flow sensor circuit 100. It is contemplated that a person having ordinary skill in the art can choose to use different values for the parameters listed in table 6 below.

TABLE 6

Flow Sensor Circuit Parameters

| Parameter | Value | Description |
| --- | --- | --- |
| C0 | 20 mA | High current level |
| C1 | 0.5 mA | Low current level |
| sdLf | 0.1° C. | Standard deviation low temperature fault threshold for standard deviation of thermistor temperature - a standard deviation below this threshold indicates that thermistor is not reading the actual temperature, possibly due to an open circuit or other electrical fault |
| avLf | 0.1° C. | Average low temperature fault threshold for average thermistor temperature - an average temperature below this threshold indicates that the thermistor is not self heating, possibly due to an open circuit or electrical fault |
| sdBC | 1.1° C. | Bubble clog standard deviation threshold - high standard deviation threshold of thermistor temperature indicating the presence of bubbles or a clog in the flowpath |
| sdSA | 0.5° C. | Air stoppage standard deviation threshold - Low standard deviation threshold of thermistor temperature indicating the presence of air in the flowpath or a stoppage of fluid flow in the flowpath |
| T1 | 10 Sec. | First time period - thermistor self heating while high current is applied to thermistor |
| T2 | 60 Sec. | Second time period - thermistor temperature measurements taking place while high current is applied to thermistor |
| T3 | 10 Sec. | Third time period - thermistor cooling down while low current is applied to thermistor |
| T4 | 30 Sec. | Fourth time period - thermistor temperature measurements taking place while low current is applied to thermistor |
| calT | 5° C. | Calibration threshold - thermistor temperature threshold indicating that one or more thermistor in a multiple stream water analyzer is not correctly calibrated |
| airT | 48° C. | Air threshold - thermistor temperature threshold indicating the presence of air in flowpath |
| stopT | 46° C. | Stopped threshold - thermistor temperature threshold indicating the presence of stopped fluid flow in the flowpath |
| SRate | 10 Hz | Measurement sample rate |
| tempHi | 100° C. | High temperature electronic fault threshold - high thermistor average temperature threshold indicating that an electronic fault is present in the flow sensor circuit |
| tempLo | 0° C. | Low temperature electronic fault threshold - low thermistor average temperature threshold indicating that an electronic fault is present in the flow sensor circuit |

It is contemplated that in some embodiments, the values of the parameters listed in Table 6 above can be adjusted by the user to better match the properties of the fluid in the flowpath. One way adjustments can be made is via a display 160 with a touch screen.

Turning to FIG. 14A, processing unit 145 starts in step 605. In step 610, processing unit 145 applies high current (C0) to thermistor 150 for a first length of time (T1), thereby allowing thermistor 150 to self heat. In step 615, processing unit 145 takes temperature measurements of thermistor 150 at a first sample rate (SRate) for a second length of time (T2) while high current continues to be applied to thermistor 150 and stores these measurements in the memory 146 of processing unit 145. Further, in step 615, processing unit 145 calculates the average (T2av) and standard deviation (T2sd) of the measurements taken during T2 and stores T2av and T2sd in the memory 146 of processing unit 145.

In step 620, processing unit 145 applies low current (C1) to thermistor 150 for a third length of time (T3), allowing thermistor 150 to cool down. As can be seen, in this embodiment, the magnitude of high current (C0) is about four times greater than the magnitude of low current (C1), however, it is contemplated that a person having ordinary skill in the art can choose to use different high current and low current magnitudes.

In step 625, processing unit 145 takes temperature measurements of thermistor 150 at a first sample rate (SRate) for a fourth length of time (T4) while low current continues to be applied to thermistor 150 and stores these measurements in the memory 146 of processing unit 145. Further, in step 625, processing unit 145 calculates the average (T4av) and standard deviation (T4sd) of the measurements taken during T4 and stores T4av and T4sd in the memory 146 of processing unit 145.

In step 630, T2sd calculated in step 615 is compared to the standard deviation low fault level (sdLF). If T2sd is less than sdLF, a flow sensor open circuit fault is reported to the user in step 631 via display 160 and the program proceeds to step 632 where water analyzer 5 is stopped. If T2sd is greater than or equal to sdLF, the program proceeds to step 635, where the absolute value of the difference between T2av and T4av is compared to the average low fault level (avLF). If the absolute value of the difference between T2av and T4av is less than avLF, an error indicating that flow sensor circuit 100 has a fault preventing thermistor 150 from self-heating is reported to the user in step 636 via display 160 and the program proceeds to step 637 where water analyzer 5 is stopped.

If the absolute value of the difference between T2av and T4av is greater than or equal to avLF, the program proceeds to step 640 where T2av is examined to see if it is less than tempLo or greater than tempHi. If T2av is less than tempLo or greater than tempHi, a temperature threshold flow sensor circuit fault error is reported to the user in step 641 via display 160 and the program proceeds to step 642 where water analyzer 5 is stopped.

If T2av is greater than or equal to tempLo or less than or equal to tempHi, the program proceeds to step 645 where T4av is examined to see if it is less than tempLo or greater than tempHi. If T4av is less than 0° C. or greater than 100° C., a temperature threshold flow sensor circuit fault error is reported to the user in step 646 via display 160 and the program proceeds to step 647 where water analyzer 5 is stopped. A values of about 0° C. and a value of about 100° C. were selected as values for tempLo, low temperature electronic fault threshold, and tempHi, high temperature electronic fault threshold, for steps 640 and 645 in this embodiment because those are not readily attainable temperature values during normal use of water analyzer 5 and would indicate an electronic fault in flow circuit 100 of water analyzer 5.

If T4av is greater than or equal to tempLo or less than or equal to tempHi, the program proceeds to step 650 where T2sd calculated in step 615 is compared to the standard deviation bubble clog fault level (sdBC). If T2sd is greater than sdBC, the presence of bubbles or a clog in flowpath 10 is reported to the user in step 651 via display 160 and the program proceeds to step 652 where water analyzer 5 is stopped. A high standard deviation of temperature, standard deviation exceeding sdBC, indicates that the presence of one or both of bubbles or a clog in flowpath 10 because bubbles allow brief higher temperature excursions and clogs allow the temperature of the fluid in the flowpath to rise over time, which usually results in the production of extra bubbles from gasses coming out of the heated fluid in flowpath 10.

If T2sd is less than or equal to sdBC, the program proceeds to step 655 where T2sd calculated in step 615 is compared to the standard deviation stopped air fault level (sdSA). If T2sd is less than sdSA, the presence of air or a stoppage in the flowpath is reported to the user in step 656 via display 160 and the program proceeds to step 657 where water analyzer 5 is stopped. A low standard deviation of temperature, a standard deviation lower than sdSA, indicates that the average temperature of the contents of flowpath 10 have reached a single steady state value. A low standard deviation of temperature indicates that the peristaltic signature of normal fluid flow in flowpath 10 is absent, which is usually caused by one or both of stopped fluid flow in flowpath 10 or the presence of air in the flowpath 10. If T2sd is greater than sdSA, a normal flowpath condition is reported to the user in step 675 via display 160 and the program proceeds back to step 610.

Figure 14C:
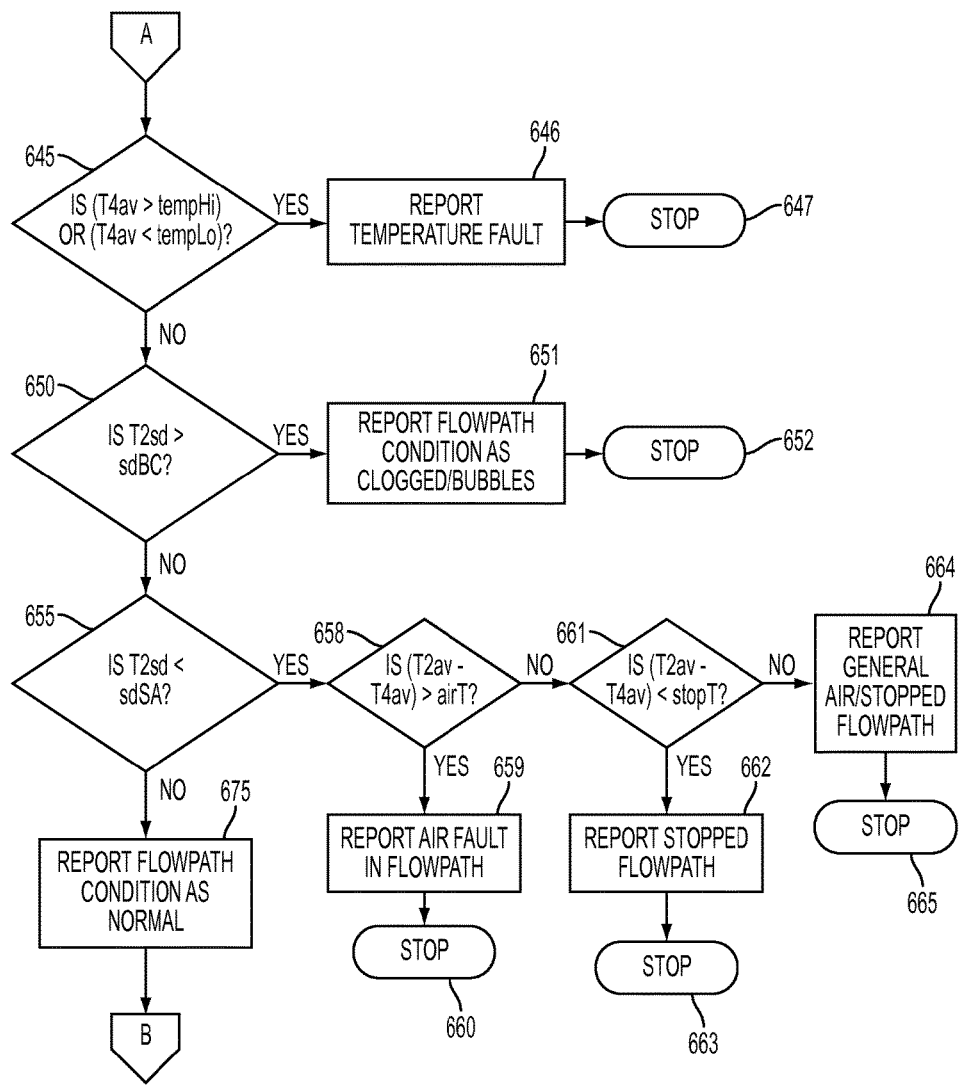

Turning to FIG. 14C, in some embodiments of flow sensor circuit 100, if T2sd is less than sdSA in step 655, the program attempts to further discern whether the fault is an air fault or a stopped flow fault. In such embodiments, if T2sd is less than sdSA in step 655, the program proceeds to step 658, where the difference between T2av and T4av is compared to the air threshold (airT), the threshold for thermistor temperature indicating the presence of air in flowpath 10. If the difference between T2av and T4av is greater than airT, the presence of air in flowpath 10 is reported to the user in step 659 via display 160 and the program proceeds to step 660 where water analyzer 5 is stopped.

If the difference between T2av and T4av is less than or equal to airT, the program proceeds to step 661, where the difference between T2av and T4av is compared to the stopped threshold (stopT), the threshold for thermistor temperature indicating the stoppage of fluid flow in flowpath 10. If the difference between T2av and T4av is less than stopT, the stoppage of fluid in flowpath 10 is reported to the user in step 662 via display 160 and the program proceeds to step 663 where water analyzer 5 is stopped. If the difference between T2av and T4av is greater than or equal to stopT, a report is provided to the user via display 160 in step 664 stating that an undetermined air presence or stoppage fault has been detected in flowpath 10 and the program proceeds to step 665 where water analyzer 5 is stopped.

Figure 14D:
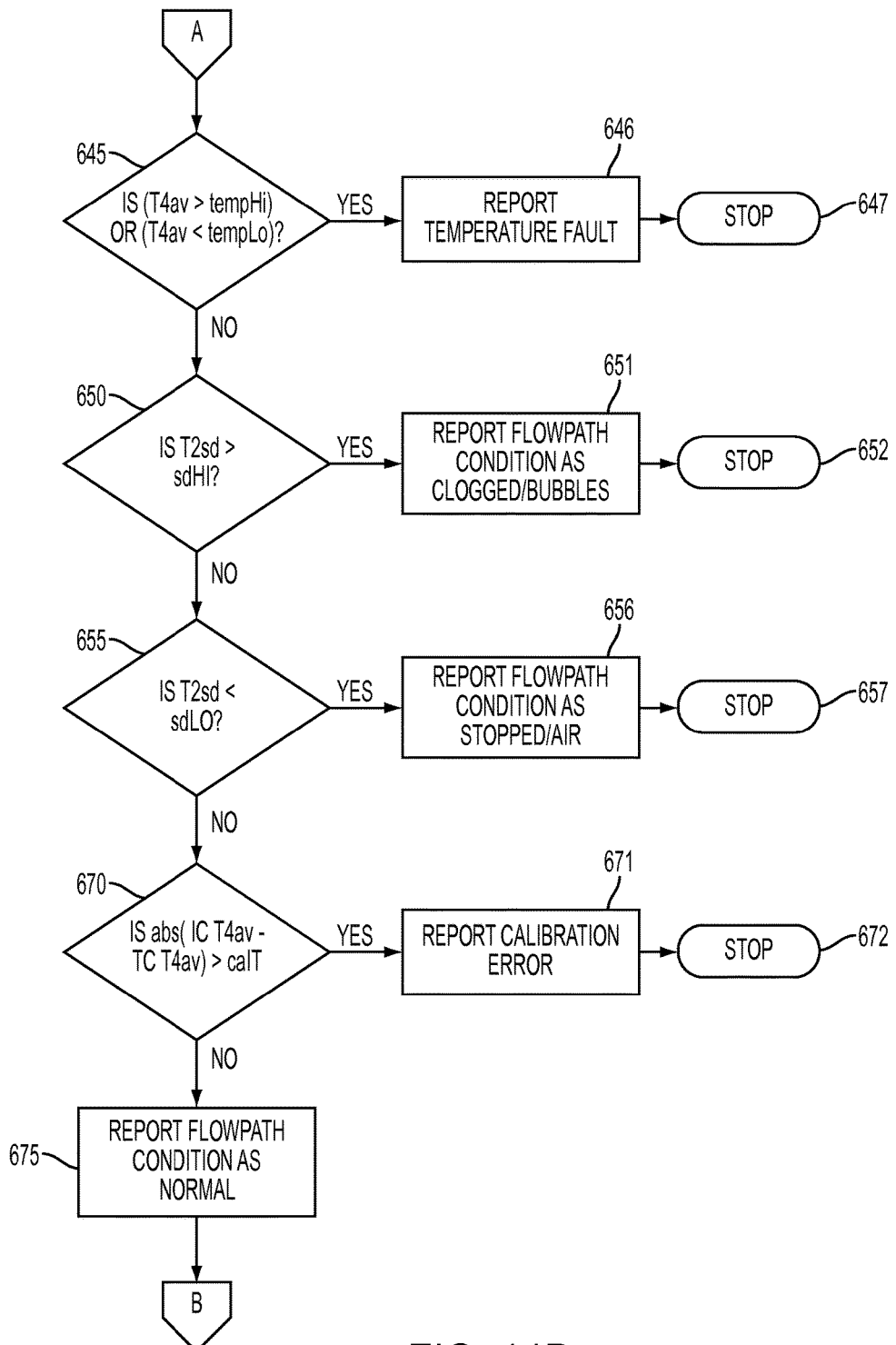

Turning to FIG. 14D, in some embodiments of water analyzer 5 having both an IC flowpath 10A and a TC flowpath 10B, the calibration of IC thermistor 150A in IC flowpath 10A and TC thermistor 150B in TC flowpath 10B are examined before the flow conditions of the flowpaths 10A, 10B are reported as normal to the user in step 675. In such embodiments, the absolute value of the difference between T4av for IC flowpath 10A and T4av for the TC flowpath 10B is compared to the multiple stream calibration threshold (calT), which is the threshold temperature difference indicating that one or both of IC thermistor 150A or TC thermistor 150B are not calibrated well. If the absolute value of the difference between T4av for the IC flowpath 10A and T4av for the TC flowpath 10B is greater than calT, a thermistor calibration error is reported to the user in step 671 via display 160 and the program proceeds to step 672 where water analyzer 5 is stopped. If the absolute value of the difference between T4av for the IC flowpath and T4av for the TC flowpath is less than or equal to calT, a normal flowpath condition is reported to the user in step 675 via display 160 and the program proceeds back to step 610.

As can be seen in FIGS. 14A-D, the averages and standard deviations of the measurements taken during T2 and T4 are used for flow sensor circuit 100 diagnostics and flowpath 10 diagnostics. The flow sensor circuit 100 performs flow sensor circuit diagnostics by examining T2sd in step 630 to see if it is extremely low (e.g. less than about 0.1 degrees Celsius), which would indicate that thermistor 150 is not reading the actual temperature, possibly due to an open circuit or other electronic fault of flow sensor circuit 100. It is contemplated that in some embodiments of flow sensor circuit 100, T4sd can also or alternatively be examined to see if it is extremely low.

Further, T2av and T4av are also examined in steps 640 and 645 to see if the average reported temperature is greater than tempHi (e.g. greater than about 100 degrees Celsius) or less than tempLo (e.g. less than about 0 degrees Celsius), which would indicate an electronic fault due to the fact that those temperatures are not easily attainable during normal operating conditions. Additionally, the absolute value of the difference between the T2av and T4av is also examined in step 635 to see if it is extremely low (e.g. less than the sdLF value of about 0.1 degrees Celsius), which would indicate that thermistor 150 is not self heating due to an electrical fault. Lastly, when flow sensor circuit 100 is used to monitor both an IC flowpath 130A and a TC flowpath 130B, the difference between T4av in IC flowpath 130A and TC flowpath 130B is compared in step 670 to see if they differ greatly (e.g. more than the calT value of about 5 degrees Celsius), which would indicate that one or both of IC thermistor 150A or TC thermistor 150B are not calibrated well.

As can be seen in FIGS. 14A-D, flowpath diagnostics are also performed by flow sensor circuit 100. The flow sensor circuit 100 performs flowpath diagnostics by examining whether T2sd in step 650 is high (e.g. greater than the sdBC value of about 1.1 degrees Celsius), which would indicate the presence of a clog or bubbles in the flowpath since bubbles allow brief high temperature excursions and clogs allow the fluid temperature to rise over time and also usually results in extra bubbles caused by gasses being released from the heated fluid in the flowpath.

Additionally, the flow sensor circuit 100 also performs flowpath diagnostics by examining whether T2sd in step 655 is low (e.g. less than the sdSA value of about 0.5 degrees Celsius), which would indicate that the fluid flow in the flowpath is stopped or contains air since the peristaltic pump signature is absent. Stated otherwise, a low standard deviation of temperature indicates that the temperature of the contents of flowpath 10 have reached a single steady state temperature, which occurs when the peristaltic pump signature is absent. Further, when a low T2sd is detected by flow sensor circuit 100, some embodiments of flow sensor circuit 100 examine the difference between T2av and T4av in an effort to differentiate between a stopped fluid state and the presence of air in flowpath 10. If the difference between T2av and T4av is greater than the value of airT, about 48 degrees Celsius, air is present in the flowpath. However, if the difference between T2av and T4av is less than the value of stopT, about 46 degrees Celsius, the fluid is stopped in flowpath 10.

While preferred embodiments of the present invention have been described, it should be understood that the present invention is not so limited and modifications may be made without departing from the present invention. Combinations of the above embodiments and other embodiments will be apparent to those of skill in the art upon studying the above description and are intended to be embraced therein. The scope of the present invention is defined by the appended claims, and all devices, processes, and methods that come within the meaning of the claims, either literally or by equivalence, are intended to be embraced therein.

This written description uses examples to disclose the invention, including the best mode, and also to enable any person skilled in the art to practice the invention, including making and using any devices or systems and performing any incorporated processes. The patentable scope of the invention is defined by the claims, and may include other examples that occur to those skilled in the art. These other examples are intended to be within the scope of the claims if they have structural elements that do not differ from the literal language of the claims, or if they include equivalent structural elements with insubstantial differences from the literal language of the claims.

What is claimed is:

1. A flow sensor circuit for a liquid flowpath comprising:
   a thermistor circuit comprising:
      a self-heated thermistor situated in a liquid flowpath;
      a processing unit; and a constant voltage or constant current source;
   wherein said flow sensor circuit is configured to:
      energize said thermistor sufficiently with said constant voltage or constant current source to effect a rise in temperature of said thermistor, wherein said rise of temperature of said thermistor has a leading edge with a slope; and
      calculate the slope of said leading edge with said processing unit;
   wherein said processing unit is configured to examine the calculated slope of said leading edge of said rise in temperature of said energized thermistor to determine whether the liquid in said liquid flowpath is flowing normally, stagnant, or contains air bubbles by comparing said calculated slope with predetermined slope values indicating normal liquid flow, stagnant liquid, and the presence of intermittent air bubbles in said liquid flowpath;
   wherein said processing unit is further configured to stop the flow of liquid in said liquid flowpath and/or adjust optional auxiliary equipment of said liquid flowpath, when said calculated slope indicates that said liquid flowpath is not flowing normally.

2. The flow sensor circuit of claim 1, wherein said liquid flowpath is comprised of a pump adjacent to said thermistor.

3. The flow sensor circuit of claim 2, wherein said liquid in said flowpath is flowing normally when the slope of said leading edge of said rise in temperature of said energized thermistor is between 1.63+0.35−0.39° C./second;
   wherein said liquid is stagnant in said flowpath when the slope of said leading edge of said rise in temperature of said energized thermistor is between 1.05+0.08,−0.11° C./second; and
   wherein intermittent air bubbles are present in said liquid in said flowpath when the slope of said leading edge of said rise in temperature of said energized thermistor is between 2.93+1.02,−0.057° C./second.

4. A flow sensor circuit for a liquid flowpath in a water analyzer comprising:
   a processing unit and a single self-heated thermistor; said thermistor is situated in a liquid flowpath of a water analyzer, wherein said liquid flowpath comprises a liquid pump arranged adjacent to said thermistor;
   a thermistor circuit configured to periodically: energize said thermistor sufficiently to effect a rise in temperature of said thermistor, wherein said rise of temperature of said thermistor has a leading edge; and calculate the slope of said leading edge;
   wherein said thermistor is energized with a constant voltage or constant current source;
   wherein the slope of said leading edge of said rise in temperature of said energized thermistor is calculated by said processing unit;
   wherein said processing unit is further configured to stop said water analyzer and/or adjust an optional oxidizer of said water analyzer, based on said calculated slope of said leading edge.

5. The flow sensor circuit of claim 4, wherein said processing unit is configured to examine the slope of said leading edge of said rise in temperature of said energized thermistor to determine whether the liquid in said liquid flowpath is flowing normally, stagnant, or contains air bubbles;
   wherein said flow sensor circuit is further comprised of a display configured to inform the user as to whether the liquid in said liquid flowpath is flowing normally, stagnant, or contains air bubbles.

6. The flow sensor circuit of claim 5, wherein said energized thermistor comprises:
   an applied voltage;
   a resistance;
   a temperature; and
   a temperature-resistance curve,
   wherein said flow sensor circuit is configured to provide said processing unit with a representation of the amount of current flowing through said thermistor;
   wherein said processing unit calculates the temperature of said thermistor using the resistance value of said thermistor and the temperature-resistance curve of said thermistor;
   wherein said processing unit calculates the resistance of said thermistor using Ohm's law, the amount of current flowing through said thermistor, and the voltage applied to said thermistor;

wherein said thermistor circuit is further comprised of a thermistor switch, voltage regulator, and thermistor drive.

7. The flow sensor circuit of claim 5, wherein said energized thermistor comprises:
   a voltage drop;
   a resistance;
   a temperature; and
   a temperature-resistance curve;
   wherein said flow sensor circuit is configured to provide said processing unit with the value of said voltage drop across said thermistor;
   wherein said processing unit calculates the temperature of said thermistor using the resistance value of said thermistor and temperature-resistance curve of said thermistor;
   wherein said processing unit calculates the resistance of said thermistor using Ohm's law, the amount of current flowing through said thermistor, and the voltage drop across said thermistor;
   wherein said thermistor circuit is further comprised of a current source, thermistor switch, and digital-to-analog converter.

8. A method of sensing the flow of fluid in a fluid flowpath, said method comprising: providing a flow sensor circuit having a self heated thermistor situated in a fluid flowpath and a constant voltage or constant current source; energizing said thermistor sufficiently to effect a rise in temperature of said thermistor, wherein said thermistor is energized with said constant voltage or constant current source; calculating the slope of the leading edge for each rise in temperature of said energized thermistor and equating the slope of the leading edge for each rise in temperature of the thermistor with the state of the fluid flowing through the fluid flowpath, using a processing unit; and stopping the flow of fluid in said fluid flowpath and/or adjusting optional auxiliary equipment of said fluid flowpath, when said calculated slope indicates that said fluid flowpath is not flowing normally.

9. The method of claim 8, wherein said energized thermistor comprises:
   an applied voltage;
   a resistance;
   a temperature; and
   a temperature-resistance curve; wherein said temperature of said thermistor is calculated by providing said processing unit with a representation of the amount of current flowing through said thermistor;
   wherein said processing unit calculates the temperature of said thermistor using the resistance value of said thermistor and the temperature-resistance curve of said thermistor;
   wherein said processing unit calculates the resistance of said thermistor using Ohm's law, the amount of current flowing through said thermistor, and the voltage applied to said thermistor.

10. The method of claim 8, wherein said energized thermistor comprises: a voltage drop; a resistance; a temperature; and a temperature-resistance curve; wherein said temperature of said thermistor is calculated by providing a processing unit with the voltage drop across said thermistor; wherein said processing unit calculates the temperature of said thermistor using the resistance value of said thermistor and temperature-resistance curve of said thermistor; wherein said processing unit calculates the resistance of said thermistor using Ohm's law, the amount of current flowing through said thermistor, and the voltage drop across said thermistor.

11. The method of claim 8, wherein said fluid flowpath is the fluid flowpath of a water analyzer; wherein said water analyzer is further comprised of a display indicating whether the fluid in said fluid flowpath is flowing normally, stagnant, or contains air bubbles.

12. A flow sensor circuit for a fluid flowpath comprising:
    a processing unit,
    a self-heated thermistor, and
    a constant voltage or constant current source; wherein said thermistor is situated in a fluid flowpath; said flow sensor circuit is configured to:
      apply a high current to said thermistor during a first time period (T1); obtain multiple measurements of the temperature of said thermistor with said processing unit while said high current is applied to said thermistor during a second time period (T2); calculate the average (T2av) and standard deviation (T2sd) of said measurements obtained during T2 using said processing unit; apply a low current to said thermistor during a third time period (T3); obtain multiple measurements of the temperature of said thermistor with said processing unit while said high current is applied to said thermistor during a fourth time period (T4); calculate the average (T4av) and standard deviation (T4sd) of said measurements obtained during T4 with said processing unit; and ascertain the state of said flowpath using said T2sd and said T4sd with said processing unit;
    wherein said processing unit is further configured to stop the flow of fluid in said fluid flowpath and/or adjust optional auxiliary equipment of said fluid flowpath, when at least one of said T2sd, T4sd, T2av, and T4av indicates that said fluid flowpath is not flowing normally.

13. The flow sensor circuit of claim 12, wherein said processing unit is configured to ascertain the state of said flowpath by comparing at least one of said T2sd, T4sd, T2av, and T4av to a bubble clog standard deviation threshold and an air stoppage standard deviation threshold to determine whether said flowpath is flowing normally, contains bubbles or is clogged, or contains air or is stopped.

14. The flow sensor circuit of claim 13, wherein said processing unit is further configured to ascertain the state of said flowpath by comparing the difference between T2av and T4av to an air threshold and a stopped threshold to determine whether said flowpath is stopped or contains air.

15. The flow sensor circuit of claim 12, wherein said processing unit is further configured to ascertain the state of said flow sensor circuit by comparing at least one of said T2sd, T4sd, T2av, and T4av to at least one of a calibration threshold, standard deviation low temperature fault threshold, and an average low temperature fault threshold to determine whether said thermistor is calibrated, whether said flow sensor circuit is open, whether said flow sensor circuit has a fault, or whether said flow sensor circuit is operating normally.

16. The flow sensor of claim 15, wherein said thermistor is an IC thermistor and said flow sensor circuit is further comprised of a TC thermistor; wherein said processing unit is further configured to ascertain the state of said flow sensor circuit by comparing a calibration threshold to the absolute value of the difference between T4av for said IC thermistor and T4av for said TC thermistor to determine if said IC thermistor and said TC thermistor are calibrated.

17. The flow sensor circuit of claim 12, wherein said processing unit is further configured to ascertain the state of said flow sensor circuit by comparing T2sd to a standard deviation low temperature threshold to determine if said thermistor is reading the actual temperature, comparing the difference between T2av and T4av to an average low temperature threshold to determine if said thermistor is self-heating, comparing at least one of said T2av and T4av to at least one of a high temperature electronic fault threshold and a low temperature electronic fault threshold to determine if an electronic fault is present in said flow sensor circuit.

18. A method of ascertaining the state of a fluid flowpath, said method comprising: providing a flow sensor circuit comprising: a processing unit; and a self-heated thermistor; wherein said thermistor is situated in a fluid flowpath; energizing said thermistor with a high current during a first time period (T1); obtaining multiple measurements of the temperature of said thermistor using said processing unit while said high current is applied to said thermistor during a second time period (T2); calculating an average (T2av) and a standard deviation (T2sd) of said measurements obtained during T2 using said processing unit; energizing said thermistor with a low current during a third time period (T3); obtaining multiple measurements of the temperature of said thermistor using said processing unit while said low current is applied to said thermistor during a fourth time period (T4); calculating an average (T4av) and a standard deviation (T4sd) of said measurements obtained during T4 using said processing unit; ascertaining the state of said flowpath using said T2sd and said T4sd using said processing unit; and stopping the flow of fluid in said fluid flowpath and/or adjusting optional auxiliary equipment of said fluid flowpath, when at least one of said T2sd, T4sd, T2av, and T4av indicates that said fluid flowpath is not flowing normally.

19. The method of claim 18, wherein said energized thermistor comprises:
an applied voltage;
a resistance;
a temperature; and
a temperature-resistance curve; wherein said temperature of said thermistor is measured by providing said processing unit with a representation of the amount of current flowing through said thermistor;
wherein said processing unit calculates the temperature of said thermistor using the resistance value of said thermistor and the temperature-resistance curve of said thermistor;
wherein said processing unit calculates the resistance of said thermistor using Ohm's law, the amount of current flowing through said thermistor, and the voltage applied to said thermistor.

20. The method of claim 18, wherein said energized thermistor comprises:
a voltage drop;
a resistance;
a temperature; and
a temperature-resistance curve; wherein said temperature of said thermistor is measured by providing said processing unit with the voltage drop across said thermistor;
wherein said processing unit calculates the temperature of said thermistor using the resistance value of said thermistor and temperature-resistance curve of said thermistor;
wherein said processing unit calculates the resistance of said thermistor using Ohm's law, the amount of current flowing through said thermistor, and the voltage drop across said thermistor.

21. The method of claim 18, wherein said fluid flowpath is the fluid flowpath of a water analyzer; wherein said water analyzer is further comprised of a display indicating whether said fluid flowpath is flowing normally, contains bubbles or is clogged, or contains air or is stopped.

22. The method of claim 21, wherein said display further indicates whether said flow sensor circuit is open, said flow sensor circuit has a fault, or said flow sensor circuit is operating normally.

23. The method of claim 12, wherein multiple measurements of the temperature of said thermistor are obtain with said processing unit by calculates the temperature of said thermistor using a resistance value of said thermistor and a temperature-resistance curve of said thermistor;
wherein said processing unit calculates the resistance of said thermistor using Ohm's law, the amount of current applied to said thermistor, and a voltage drop across said thermistor.

* * * * *